(12) United States Patent
Draht et al.

(10) Patent No.: US 11,980,961 B2
(45) Date of Patent: May 14, 2024

(54) WELDING AUXILIARY JOINING PART

(71) Applicant: BÖLLHOFF VERBINDUNGSTECHNIK GmbH, Bielefeld (DE)

(72) Inventors: Torsten Draht, Schloß Holte-Stukenbrock (DE); Sergej Hartwig-Biglau, Löhne (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 500 days.

(21) Appl. No.: 16/630,177

(22) PCT Filed: Jul. 10, 2018

(86) PCT No.: PCT/EP2018/068697
§ 371 (c)(1),
(2) Date: Jan. 10, 2020

(87) PCT Pub. No.: WO2019/011931
PCT Pub. Date: Jan. 17, 2019

(65) Prior Publication Data
US 2020/0156176 A1    May 21, 2020

(30) Foreign Application Priority Data

Jul. 11, 2017    (DE) .................. DE102017115529.5

(51) Int. Cl.
*B23K 11/16*       (2006.01)
*B21J 15/00*       (2006.01)
(Continued)

(52) U.S. Cl.
CPC .............. *B23K 11/16* (2013.01); *B21J 15/00* (2013.01); *B23K 11/002* (2013.01);
(Continued)

(58) Field of Classification Search
CPC ...... B23K 11/16; B23K 11/002; B23K 20/02; B23K 2101/006; B23K 11/0066; F16B 5/08
See application file for complete search history.

(56) References Cited

U.S. PATENT DOCUMENTS 7,645,105 B2 *   1/2010   Hengel .............. B23K 11/0053
                                                             24/270
10,364,834 B2     7/2019   Izuhara
(Continued)

FOREIGN PATENT DOCUMENTS

CN      101096976 A         1/2008
CN      104399859 A   *     3/2015
(Continued)

OTHER PUBLICATIONS

Fastener Mart, Understanding Screw Heads and Drive Styles, WayBackMachine, https://web.archive.org/web/20160402102425/ https://www.fastenermart.com/understanding-screw-heads-and-drive-styles.html (Year: 2016).*

(Continued)

*Primary Examiner* — John J Norton
*Assistant Examiner* — Franklin Jefferson Wang
(74) *Attorney, Agent, or Firm* — Reising Ethington P.C.

(57) ABSTRACT

A welding auxiliary joining part with which a welding connection, more particularly a resistance welding connection, can be established between a first component A made of a poorly weldable material and a second component made of weldable material. The welding auxiliary joining part is distinguished by a cylindrical punch shaft that can be punchingly pressed into the first component A approximately rotation-free. The punch shaft has an element head at the head underside of which only one continuous circum- (Continued)

Figure 1:
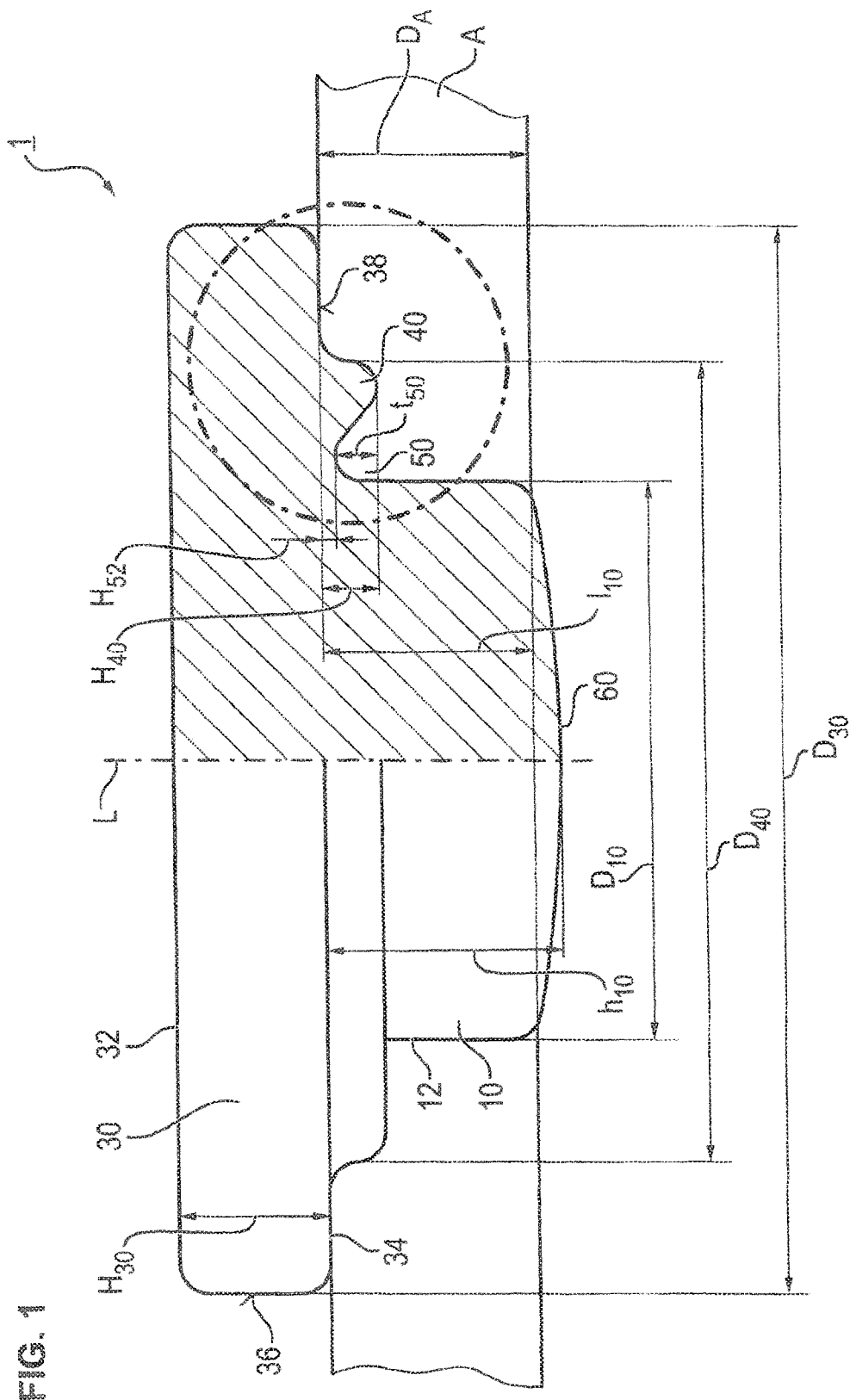

ferential clamping ring is arranged that projects axially in the direction of the punch shaft.

23 Claims, 11 Drawing Sheets

(51) Int. Cl.
    *B23K 11/00*         (2006.01)
    *B23K 20/02*         (2006.01)
    *B23K 101/00*       (2006.01)

(52) U.S. Cl.
    CPC .......... *B23K 11/0066* (2013.01); *B23K 20/02* (2013.01); *B23K 2101/006* (2018.08)

(56) References Cited

U.S. PATENT DOCUMENTS

| | | | |
|---|---|---|---|
| 10,384,295 | B2 | 8/2019 | Draht et al. |
| 10,589,374 | B2 | 3/2020 | Draht et al. |
| 2016/0123362 | A1 | 5/2016 | Iwase |
| 2016/0136880 | A1* | 5/2016 | Matsuo ................ B29C 65/562 411/502 |
| 2019/0321908 | A1 | 10/2019 | Draht et al. |
| 2021/0088062 | A1* | 3/2021 | Grojean ................ B23K 11/11 |

FOREIGN PATENT DOCUMENTS

| | | | | |
|---|---|---|---|---|
| CN | 104540628 | A | 4/2015 | |
| CN | 106363917 | A | 2/2017 | |
| DE | 4237361 | A1 | 5/1994 | |
| DE | 19740022 | A1 | 3/1999 | |
| DE | 102004025492 | A1 | 8/2009 | |
| DE | 102012013589 | A1 | 1/2014 | |
| DE | 102014201871 | A1 * | 8/2015 | ............ B21J 15/025 |
| DE | 102014201871 | A1 | 8/2015 | |
| IN | 105190059 | A | 12/2015 | |
| JP | 2010207898 | A | 9/2010 | |
| JP | 2015042417 | A | 3/2015 | |
| JP | 2016161078 | A | 9/2016 | |
| JP | 2016161078 | A * | 9/2016 | |
| WO | WO2014048885 | A2 | 4/2014 | |
| WO | WO-2014210278 | A1 * | 12/2014 | ........... B21D 39/028 |
| WO | WO2018202999 | A1 | 11/2018 | |

OTHER PUBLICATIONS

Written Opinion & International Search Report for PCT/EP2018/068697 dated Oct. 5, 2018, 8 pages.
English translation of the International Preliminary Report on Patentability for PCT/EP2018/068697 dated Jan. 14, 2020, 7 pages.
CN Office Action for CN Application No. 201880045945.1 dated Apr. 13, 2021 (18 pages).
JP Notice of Allowance for JP Application No. 2020-500162 dated Jan. 18, 2022 (4 pages).

* cited by examiner

WELDING AUXILIARY JOINING PART

1. TECHNICAL FIELD

The present disclosure relates to a welding auxiliary joining part with which a welding connection, more particularly a resistance welding connection, can be established between a first component made of poorly weldable material and a second component made of weldable material. Furthermore, the present disclosure relates to a method of manufacturing such a welding auxiliary joining part and a method of manufacturing a corresponding connection between the first and the second component by means of the welding auxiliary joining part. Finally, the present disclosure is also directed to a component composite comprising at least one first component and the above-mentioned welding auxiliary joining part.

2. BACKGROUND

For a considerable time now, the automotive industry, for example, has had a great demand for the manufacturing of welding connections between two components, at least one of which is made of a non- or poorly weldable material. These materials include, among others, aluminum or plastic. Although such materials are not suitable for manufacturing a welding connection due to their nature, they should nonetheless be made accessible for effective resistance welding, for example. For this reason, such components made of non-weldable or poorly weldable material are provided with a welding auxiliary joining part made of weldable material. Methods which describe the component configuration as described above as well as the use of a welding auxiliary joining part are disclosed among others in DE 10 2004 025 492 A1 and WO 2014/048885 A2.

Known welding auxiliary joining parts are adjusted to resistance welding particularly in their shape. In resistance welding, a high current flow is generated in the welding auxiliary joining part, so that in the contact area between the welding auxiliary joining part and at least one second component a melting of material is created and thus a welding connection between the welding auxiliary joining part and the second component. Such a welding auxiliary joining part is described, for example, in DE 42 37 361 A1. This welding auxiliary joining part comprises a cylindrical shaft having an element head arranged at one end and a welding stud arranged at the other end. The element head is distinguished by a ring bead at its head underside facing the shaft. This ring bead is arranged at the radial outer rim of the head underside so that it forms the radial outer rim of the head underside and thus also of the element head. The welding auxiliary joining part described here is mainly pressed into aluminum components, particularly aluminum sheets. During this pressing-in, the shaft of the welding auxiliary joining part creates a lead-through opening and the ring bead compresses the reveal of the punched lead-through opening towards the center of the hole. In this way, any clearance between the shaft and the opening in the component is eliminated. At the same time, the ring bead also displaces material radially outwards, which can flow off unhindered. Due to the radial outer arrangement of the ring bead and its wedge-like cross-sectional shape, this shaping of the element head supports a deep penetration of the welding auxiliary joining part into the aluminum component. Accordingly, not only the welding stud but also a part of the element shaft protrudes disadvantageously beyond the free surface of the first component and thus hinders a future welding process.

A further welding auxiliary joining part for resistance welding is described in DE 10 2014 201 871 A1. In contrast to the resistance welding element described above, the underside of the element head comprises at least two rigid, continuous circumferential stamping rings which project from the underside of the element head in the axial direction and are spaced apart from each other in the radial direction. In contrast to the welding auxiliary joining part described above, the stamping rings at the underside of the element head are used for selective sealing of the joining spot. For this purpose, the stamping rings are pressed or stamped into the surface of the first component facing the head underside. This prevents corrosive media, such as moisture and/or dirt, from penetrating into the gap between the element head and the adjacent component. This is realized in particular by the first stamping ring arranged radially at the outer side. The radially inner stamping ring provides an inner sealing which, for example, prevents the leaking of gases to the outside during the resistance welding process or of an optionally used adhesive. Accordingly, the direction of the material flow of displaced material is not important. Rather, it should only be ensured that the at least two stamping rings are enclosed by the material of the adjacent component. It is particularly the embedding of the stamping rings in the component material that ensures the desired sealing. However, it has been found that it is exactly the opposing material displacement of the stamping rings adjacent to each other that leads to a material congestion that generates compressive stresses at the component surface. These compressive stresses counteract the penetration of the welding auxiliary joining part and thus adversely affect the joining process of the welding auxiliary joining part.

Based on the discussed prior art, an object of at least some implementations of the present invention is to provide a welding auxiliary joining part which is easily and reliably pressable into a component. In addition, it is an object of at least some implementations of the present invention to provide a corresponding connection between two components by means of the welding auxiliary joining part, a connection method of these two components by means of the welding auxiliary joining part as well as a manufacturing method of such a welding auxiliary joining part.

3. SUMMARY

The above object is solved by a welding auxiliary joining part, by a connection between at least one component and said welding auxiliary joining part, by a manufacturing method of a component composite of at least one first component and the welding auxiliary joining part and by a manufacturing method of the welding auxiliary joining part. Further embodiments and developments are set forth in the following description, the accompanying drawings and the appending claims.

With the welding auxiliary joining part, a welding connection, in particular a resistance welding connection, is establishable between a first component made of poorly weldable material and a second component made of weldable material. For this purpose, the welding auxiliary joining part comprises the following features: a punch shaft which is pressable into the first component approximately rotation-free, which extends along a longitudinal axis of the welding auxiliary joining part and which has an element head at a first axial end and a welding contact zone projecting from the punch shaft in the axial direction at a second axial end. The element head of the welding auxiliary joining part extends radially beyond the punch shaft and comprises a head upper side facing away from the shaft and a head underside facing the shaft, which are connected to one another by a circumferential face or a cylindrical lateral face radially delimiting the element head. Furthermore, the element head is distinguished in that the head underside comprises at least one clamping ring which extends continuously circumferential around the punch shaft and projects axially in the direction of the punch shaft and which is arranged at a first radial distance from the punch shaft, has a triangular-like cross-sectional shape which tapers in the axial direction of the punch shaft and which is arranged at a side facing away from the punch shaft radially spaced from the circumferential face of the element head.

The welding auxiliary joining part is distinguished by a specific design of the element head, namely the underside of the element head. This underside of the element head has a continuous circumferential clamping ring which is arranged selectively spaced from the cylindrical punch shaft and the radial outer side of the element head. The clamping ring may be designed to clamp the punch shaft by a correspondingly diverted material flow and not to hinder the penetration of the welding auxiliary joining part into the first component at the same time. It may be preferred that the radial position of the clamping ring with respect to the punch shaft to be fastened in the first component is adapted to the cross-sectional shape or the displacement volume of the clamping ring.

According to a further embodiment, the clamping ring is selectively used only individually at the head underside with a sufficient distance to the radial outer edge of the element head. In this way, the material flows generated by the clamping ring serve radially inwards to clamp the punch shaft and radially outwards for further clamping against the surrounding material of the welding auxiliary joining part, without causing an obstructive material displacement with another stamping ring (see above in the prior art). In addition, the arrangement of the clamping ring at the underside of the element head ensures that the radially outwardly directed material flow cannot flow off without effect in the direction of free component surfaces in particular. However, these effects can also be achieved by a combination with another clamping ring of similar geometry which is arranged concentrically to the punch shaft and radially outwards or by using a stamping ring. The clamping ring may also have the triangular-like cross-section. The stamping ring may be formed to be thickened or spherical without realizing a directed material flow.

According to a further embodiment of the welding auxiliary joining part described above, the clamping ring is surrounded at the side facing away from the punch shaft by a radially extending outer ring face at the head underside and/or by at least one outer ring at the head underside which extends either continuously or openly circumferential around the punch shaft and projects axially in the direction of the punch shaft. In this context, the outer ring may have the shape of a clamping ring or a stamping ring.

For supporting the fastening of the welding auxiliary joining part in a component, it has proved to be advantageous to provide at least one additional ring at the head underside of the element head in addition to the clamping ring. This ring may be arranged in such a manner that it surrounds the abovementioned clamping ring. Depending on its design, this outer ring has the same shape as the clamping ring described above or is implemented as a stamping ring.

An additional clamping ring as an outer ring supports the fastening of the welding auxiliary joining part in the component. In addition, this additional clamping ring advantageously increases the material flow in the direction of the punch shaft and thus the clamping of the punch shaft and the entire welding auxiliary joining part in the component.

Likewise, however, it may also be preferred to design the outer ring in the form of a stamping ring, with a spherical or uniform cross-sectional shape. Since this stamping ring is pressed into the component in the same manner as the clamping ring into the component material during the joining of the welding auxiliary joining part, it is particularly the shape of the stamping ring and its connection with the component that contributes to a sealing of the joining spot to the outside. Furthermore, the stamping ring may prevent a material flow radially outwards from the clamping ring. As a result, the clamping effect of the material displacement created by the clamping ring is supported. In addition, despite its preferred uniform cross-sectional shape, the stamping ring contributes to a material displacement of the component material in the direction of the punch shaft. This material displacement thus supports the clamping of the punch shaft in the component material.

It may also be preferred to provide instead of the outer ring a ring face at the head underside of the element head extending circumferentially around the clamping ring at the outer side. This means that the element head at this ring face may extend parallel to the upper side of the element head. Furthermore, it may be preferred that this ring face transitions into the circumferential face radially delimiting the element head.

According to a further embodiment of the welding auxiliary joining part, the clamping ring at the side facing the punch shaft is arranged adjacent to a radially extending inner ring face at the head underside and/or adjacent to at least one inner ring which extends continuously or openly circumferential around the punch shaft and projects axially in the direction of the punch shaft at the head underside of the element head. In this context it may be further preferred that the at least one inner ring has the shape of a clamping ring or a stamping ring.

In a similar way as described above with regard to the underside of the element head arranged radially outwards relative to the clamping ring, the radial inner side relative to the clamping ring also comprises a ring face or an inner ring. The ring face may be arranged radially at the inner side is a connecting face between the punch shaft and the radial inner side of the clamping ring. This inner ring face is also differently shaped according to different design possibilities, as shown in the following description. According to one embodiment, this inner ring face extends perpendicularly to the longitudinal axis of the punch shaft, may be parallel to the upper side of the element head. It may also be preferred to form this inner ring face as a groove surrounding the punch shaft. Accordingly, the inner ring face comprises a recess extending circumferentially around the punch shaft in the direction of the upper side of the element head. This recess or groove may serve to receive material displaced by the clamping ring during the joining of the welding auxiliary joining part in the direction of the punch shaft. This displaced material accumulates in this recess and, depending on the size of the receiving volume of this recess or groove, leads to mechanical radial stresses directed radially inwards, i.e. towards the punch shaft. These radial stresses clamp or retain the welding auxiliary joining part within the component.

It may also be preferred to arrange within the clamping ring an inner ring of a shape comparable to the outer ring described above. This inner ring may have the shape of a further clamping ring or the shape of a stamping ring. Accordingly, a further clamping ring as an inner ring also contributes to the fastening of the welding auxiliary joining part. It may also be preferred that a stamping ring pressed in as inner ring contributes to the sealing of the joining spot. Another function of an inner stamping ring is that this stamping ring may represent a material flow blockade for the material displaced by the clamping ring. Thus, the clamping ring would also contribute to the fastening of the welding auxiliary joining part in the component by radially inwardly directed radial stresses at the stamping ring.

According to a further embodiment of the welding auxiliary joining part, the axial cross-sectional shape of the clamping ring is formed by a radially inner ring side and a radially outer ring side, the inner ring side of which encloses with the punch shaft, with the longitudinal axis of the punch shaft, an inclination angle $\alpha$ which may be in the range of $10° \leq \alpha \leq 70°$, or which may be $50°$.

The inner ring side of the clamping ring faces the preferably cylindrical punch shaft. Accordingly, the inclination of the radially inner ring side ensures the strength and alignment of the displaced material flow in the direction of the punch shaft. Depending on the material of the first component to be displaced, it may be preferred, for example, to adjust the angle of the radially inner ring side so that an optimum clamping of the punch shaft is achieved by the material displacement. By this selective adjustment of the inclination of the radially inner ring side in relation to the longitudinal axis of the punch shaft, the acting compressive stresses between the radial outer side of the punch shaft and the radially inner ring side may also be influenced. This may support the reliable pressing-in of the welding auxiliary joining part into the first component.

According to a further embodiment, the outer ring side of the clamping ring encloses with the surrounding outer ring face of the head underside of the element head an angle $\beta$ in the range of $70° \leq \beta \leq 110°$. The angle $\beta$ may be approximately $90°$ or in the range of $80°$ to $85°$.

As already discussed above, the clamping ring is arranged at a certain distance from the radial circumferential face of the element head. This ensures that although the clamping ring may cause a material displacement radially outwards with respect to the punch shaft this displaced material below the element head, i.e. in the press-in direction, still contributes to the fastening of the welding auxiliary joining part.

Accordingly, it may be preferred to also vary the inclination of the outer ring side in order to adjust the material flow to the component material and/or to achieve a further supporting effect for fastening the welding auxiliary joining part in the first component. In this context it may be further preferred that the angle $\beta$ forms a right angle. This right-angled or orthogonal arrangement indeed reduces a material flow directed radially outwards to a minimum. At the same time, however, this right-angled alignment also ensures lateral or radial stabilization of the welding auxiliary joining part within the component material of the first component.

It may also be preferred that the cross-sectional shape of the clamping ring is approximated to a right-angled triangle, the hypotenuse of which faces the punch shaft.

According to the cross-sectional shape of the clamping ring described above, the hypotenuse of this cross-sectional shape is directed towards the punch shaft. In addition, the one catheter of the triangular cross-sectional shape may be arranged perpendicular to the underside of the element head and thus parallel to the radial outer side. By means of this design of the clamping ring, the material flow created by the clamping ring is almost completely directed towards the punch shaft. Thus, this shaping also achieves a stronger fastening of the welding auxiliary joining part in the component.

According to a further embodiment, the inner ring described above and/or the outer ring are formed as stamping rings which comprise a spherical cross-sectional shape. This spherical cross-sectional shape may be symmetrical to a center line of the cross-sectional shape. In this way, when the welding auxiliary joining part is pressed into the component, a material displacement occurs which is uniformly directed radially outwards and radially inwards.

According to a further embodiment of the auxiliary welding joining part, at the head underside only one clamping ring is arranged continuously circumferential around the punch shaft and is positioned at a first radial distance from the punch shaft, has a triangular cross-sectional shape which tapers in the axial direction of the punch shaft, and has at a side facing away from the punch shaft a radially extending outer ring face at the head underside which transitions into the circumferential face of the element head.

According to a further embodiment of the welding auxiliary joining part, a groove recessed in the direction of the element head is provided at the head underside between the punch shaft and the adjacent clamping ring or an adjacent stamping ring.

As already described above, this groove or recess serves to receive displaced material which has been displaced by the clamping ring or a stamping ring in the direction of the punch shaft. This groove is formed in its depth within the element head. Since this design of the groove is variable depending on the component material, the component geometry and also the geometry of the welding auxiliary joining part, this groove can also be adapted to the respective connection situation between the welding auxiliary joining part and the component. This opens up the possibility to adjust the receiving volume of the groove for the displaced material according to the amount of material displaced by the clamping ring. If the receiving volume of the groove may be designed to be smaller with regard to the volume of the displaced material of the component, stronger radial stresses result from the displaced material in the direction of the punch shaft. In the same way, it may be preferred to realize an accumulation of a larger volume of displaced component material in the proximity of the punch shaft and underneath the element head by an increased depth of the groove. This larger amount of material, which may be present in a compressed manner in the receiving volume of the groove, provides an additional stabilization of the connection between the welding auxiliary joining part and the component.

The above-described selective adjustment of the receiving volume of the groove is reflected in the design wherein the element head has a greater thickness in the longitudinal direction of the punch shaft in the portion or area of the groove than outside of the groove and the clamping ring and/or the stamping ring.

According to a further embodiment, a ratio of a head diameter of the element head to a shaft diameter of the cylindrical punch shaft is $\geq 2$. It is also preferred that a shaft diameter $D_{10}$ of the punch shaft compared to an outer diameter $D_{40}$ of the clamping ring is approximately $0.5\ D_{40} \leq D_{10} \leq 0.8\ D_{40}$. According to a further embodiment, the punch shaft has a shaft diameter $D_{10}$ in the range of $3\ mm \leq D_{10} \leq 5\ mm$, such as $4\ mm$, the element head has a head diameter $D_{30}$ in the range of 7 mm≤$D_{30}$≤12 mm, such as 10 mm, and the clamping ring has a ring diameter $D_{40}$ in the range of 4 mm≤$D_{40}$≤10 mm, such as 8 mm. Furthermore, the element head may have an axial thickness $H_{30}$ between the head upper side and the head underside outside of a groove or a ring in the range of 0.8 mm≤$H_{30}$≤1.8 mm, such as 1.2 mm, and the punch shaft has a length $h_{10}$ in the range of 1.6 mm≤$h_{10}$≤4 mm, such as 2.9 mm or 2 mm or 1.7 mm. According to a further embodiment, the clamping ring has a height $H_{40}$ with respect to the head underside in the range of 0.2 mm≤$H_{40}$≤0.6 mm, such as 0.4 mm. It may also be preferred that the groove has a depth $t_{50}$ compared to a height of a directly adjacent clamping ring or stamping ring in the range of 0.2 mm≤$t_{50}$≤0.6 mm, such as 0.3 mm. According to a further embodiment, the clamping ring has a height $H_{40}$ with respect to the head underside in the range of 0.15 mm≤$H_{40}$≤1 mm, such as 0.5 mm.

The present disclosure also includes a further embodiment of the welding auxiliary joining part. In this embodiment, the element head is formed as a countersunk head at least radially outwards from the clamping ring. The countersunk head comprises a radially outward decreasing axial thickness $H_{30'}$ between head upper side and head underside outside of a groove or a ring in the range of 0.3 mm≤$H_{30'}$≤0.8 mm, or 0.4 mm≤$H_{30'}$≤0.5 mm. In addition, the punch shaft measured between the free shaft end and the radially outermost head underside has a length $h_{10'}$ in the range of 1.4 mm≤$h_{10'}$≤3 mm, or 1.4 mm≤$h_{10'}$≤2.2 mm or 1.4 mm≤$h_{10'}$≤1.6 mm.

Compared to the welding auxiliary joining part described above, this embodiment has a lower construction height in combination with a countersunk head. This allows a reduction in the interference contour of the element head protruding from the component surface after the setting process. The countersunk head may be distinguished by a radially outwardly, continuously decreasing element head thickness. In addition, the height of the element head is selected to be lower in order to achieve a complementary effect of countersunk head and axial element length. Also in terms of element design for thin components or for welding auxiliary joining parts driven deeper into the component, the shaft is formed shorter than in the above described embodiment. In this way it is ensured that in particular with thin components the element head and the end of the element shaft protrude only slightly from the respective component surface.

Furthermore, the clamping ring of the welding auxiliary joining part with countersunk head may have a height $H_{40}$ with respect to the head underside adjacent to the clamping ring in the range of 0.2 mm≤$H_{40}$≤1 mm, or 0.6 mm and/or 0.4 mm. The geometrical properties of the clamping ring for the element with countersunk head thus correspond to the geometrical properties of the element without countersunk head already described above.

According to a further embodiment of the welding auxiliary joining part, the welding contact zone is formed by a welding stud, which projects axially beyond the punch shaft and has a smaller radial extent than the punch shaft. According to a further embodiment, the welding contact zone is formed by a convex weld projection which projects in axial direction beyond the punch shaft and has the same radial extent as the punch shaft.

For establishing a welding connection between the welding auxiliary joining part and a second component, it is essential that the welding contact zone projects beyond the first component. Because of this geometric configuration, it is possible to establish an electrical contact between the welding auxiliary joining part and the second component. With the aid of this electrical contact, the resistance welding is then performed. It has been found that a welding contact zone in the radial extent of the entire punch shaft is disadvantageous for the formation of a connection-producing weld nugget. Therefore, the welding contact zone is provided in a smaller radial extent than the outer diameter of the punch shaft. According to an embodiment, the welding contact zone is formed by a welding stud, i.e. a hump or projection projecting in the direction opposite to the element head. This projection has a smaller radial extent than the punch shaft. The projection may be located centrally at the free end of the punch shaft. A shape which supports resistance welding, for example, is pointed, hemispherical, conical or frustoconical as well as pyramid-shaped or truncated pyramid-shaped. It is also possible that the welding stud is formed by several pointed projections arranged side by side.

According to the second alternative mentioned above, the free end of the punch shaft has a shape that is rounded and arched away from the head of the element. This arching, which may have the shape of a ball segment, would also establish a punctiform contact with a second component in order to perform the resistance welding on this basis. As can be seen from the discussion of the welding contact zone, the length of the punch shaft is measured up to the beginning of the welding contact zone. This end may to be considered equal to the end of a cylindrical lateral face of the punch shaft. Accordingly, the welding contact zone or welding contact area projects beyond the length of the punch shaft. It may also be preferred to consider the full length of the punch shaft, which includes the welding contact zone.

According to a further embodiment, the element head may have a smaller axial thickness in the portion or area of the ring face than in a radial portion or area between the clamping ring and the punch shaft, in the portion or area of the groove. By this design it may also be possible to increase the clamping forces at the punch shaft due to the material displaced by the clamping ring. This is because a smaller axial thickness in the radial portion or area between the clamping ring and the punch shaft reduces the volume in which displaced material is receivable. Accordingly, the displaced material is more strongly compressed and causes increased clamping forces at the punch shaft.

Furthermore, the selective thickness design of the element head adjacent to the punch shaft and radially outside adjacent to the clamping ring ensures a higher stability against shear loads. The shear load acts perpendicular to the punch shaft. It occurs, for example, when the component in which the welding auxiliary joining part has been set is moved against a second component along the adjoining surfaces of the components adjacent to each other with which the welding auxiliary joining part has been welded. During this shear load, the thick portion of the element head arranged radially inside the clamping ring provides additional stabilizing support at the less thick portion of the element head arranged radially outside the clamping ring. By these stepped thickness portions of the element head, the connection between the welding auxiliary joining part and the adjoining component may be reinforced, preferably a component made of poorly weldable material such as aluminum, an alloy, plastic, laminate or a composite material.

The present disclosure further comprises a component composite or component assembly of a first component and the above-mentioned welding auxiliary joining part in one of its embodiments. The component may be made of a poorly weldable material such as aluminum or plastic. The welding auxiliary joining part is pressed into the component in such a manner that it is fastened to it in a loss-proof manner. This opens up the possibility to further process the component composite immediately or later after transport to another processing location. According to a further embodiment, a connection is provided of the first component to the welding auxiliary joining part, which has been connected to a second component by means of a welding connection.

Furthermore, the present disclosure also includes a manufacturing method of a component composite of at least a first component and the welding auxiliary joining part according to one of the embodiments described above. The manufacturing method may serve for manufacturing a vehicle body by means of the welding auxiliary joining part described above. The above manufacturing method has the following steps: providing the first component, preferably of poorly weldable material, pressing the welding auxiliary joining part into the first component approximately rotation-free, so that the punch shaft completely penetrates the component, the welding contact zone projects beyond a component side facing away from the element head and the element head abuts at a component side facing the element head and thereby the clamping ring is pressed into the facing component side.

In order to be able to establish a welding connection between a first component and a second component, the first component is provided with the welding auxiliary joining part described above. For this purpose, the first component is provided in such a manner that the welding auxiliary joining part described above can be pressed into this component. The first component may be made of non- or poorly weldable material. In this case, the electrically conductive welding auxiliary joining part then forms the basis for being able to produce a resistance welding method even with a first component made of non-weldable or poorly weldable material. In order to actually be able to permanently weld the first component to a second component, the welding auxiliary joining part is anchored permanently in the first component. For this purpose, a mechanical pressure force is exerted on the element head of the welding auxiliary joining part so that the punch shaft is pressed into the first component. As a result, the punch shaft completely penetrates the first component. Accordingly, the welding contact zone at the component side of the first component facing away from the element head protrudes beyond this component side. During pressing-in, the head underside of the element head is also pressed against the component side facing the element head in such a manner that the clamping ring is pressed into the first component. The thus initiated material flow radially inwards in the direction of the punch shaft ensures a clamping of the punch shaft by the displaced material of the first component.

It may be preferred that the manufacturing method comprises the following further steps: arranging the first component with the welding auxiliary joining part above a second component such that an electrical contact is establishable between the welding contact zone of the punch shaft and the second component, and resistance welding of the welding auxiliary joining part and the second component.

Furthermore, the manufacturing method may provide that the welding auxiliary joining part is fastened in the first component in a loss-proof manner after the pressing-in. On this basis, the first component with the welding auxiliary part is present as a semi-finished product and can be further processed directly on site, after intermediate storage or at another location after a transport that has taken place in the meantime. Accordingly, the manufacturing method then may also comprise the resistance welding of the semi-finished product to the second component at the manufacturing location of the pressing-in and/or after an intermediate storage of the semi-finished product after the pressing-in or after a transport from the manufacturing location of the pressing-in to a processing location for the resistance welding.

As can be seen from the above method steps, the manufacturing method of the component composite offers high flexibility in the preparation of the actual connection with the second component and further flexibility in the organization of the connection with the second component. This is because while the semi-finished product composed of the first component and the welding auxiliary joining part forms the essential basis for the component composite, this component composite can be realized anywhere by means of a resistance welding method. This is because the first component with a welding auxiliary joining part can be easily manufactured on site or after a necessary transport at any other location using a known resistance welding method with the second component made of preferably weldable material or also equipped with a welding auxiliary joining part.

According to a further embodiment of the manufacturing method of the component composite, by pressing the clamping ring into the first component, a material portion of the first component is displaced radially inwards, so that the punch shaft is clamped by the displaced material.

The present disclosure also comprises a manufacturing method of the welding auxiliary joining part. In the context of this manufacturing method, a bar profile is formed into the geometry of the welding auxiliary joining part, such as by cold forming or cold rolling, and subsequently the welding auxiliary joining part is cut to length from the bar profile.

4. BRIEF DESCRIPTION OF THE ACCOMPANYING DRAWINGS

Figure 2:
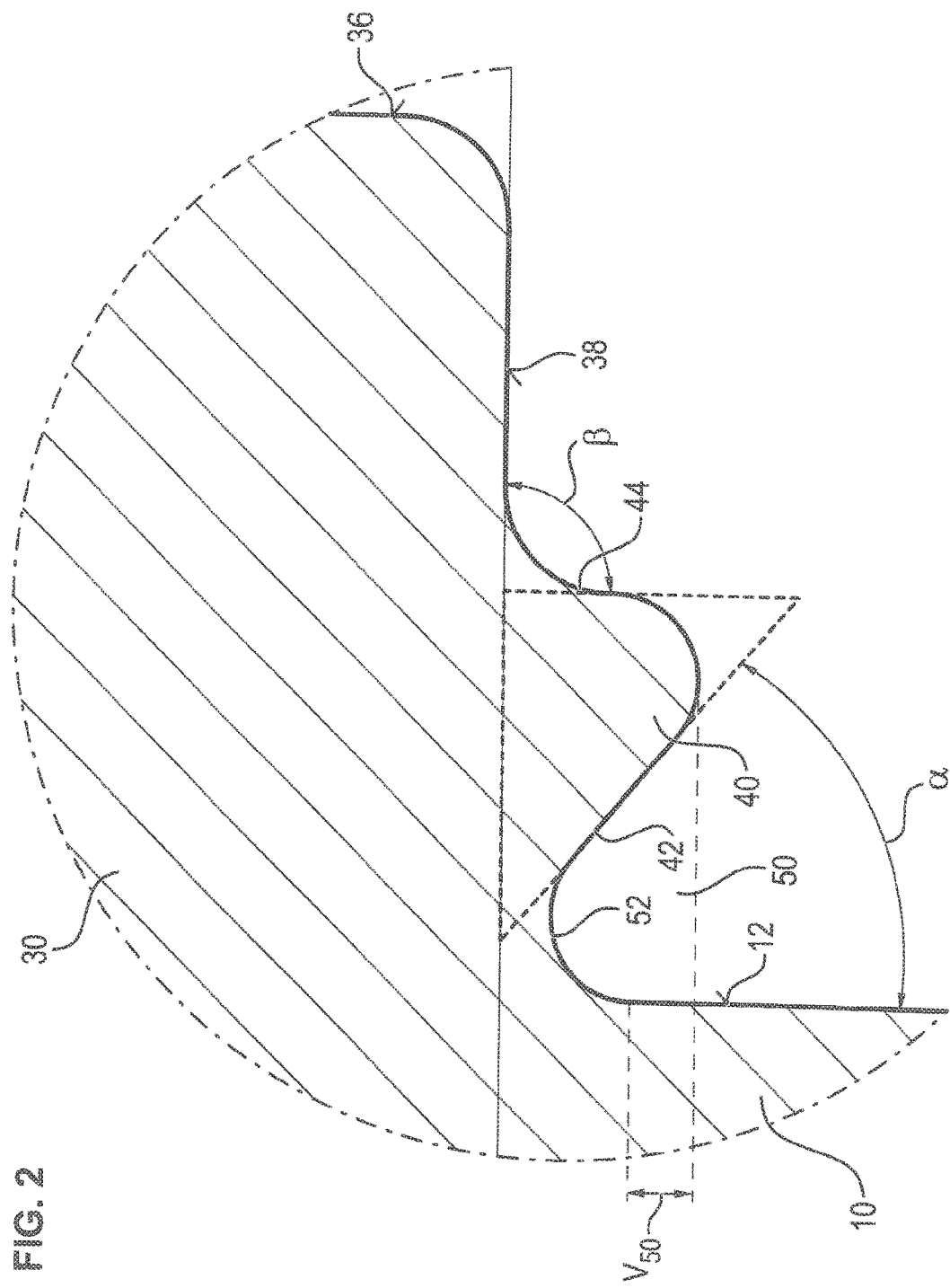
Figure 3:
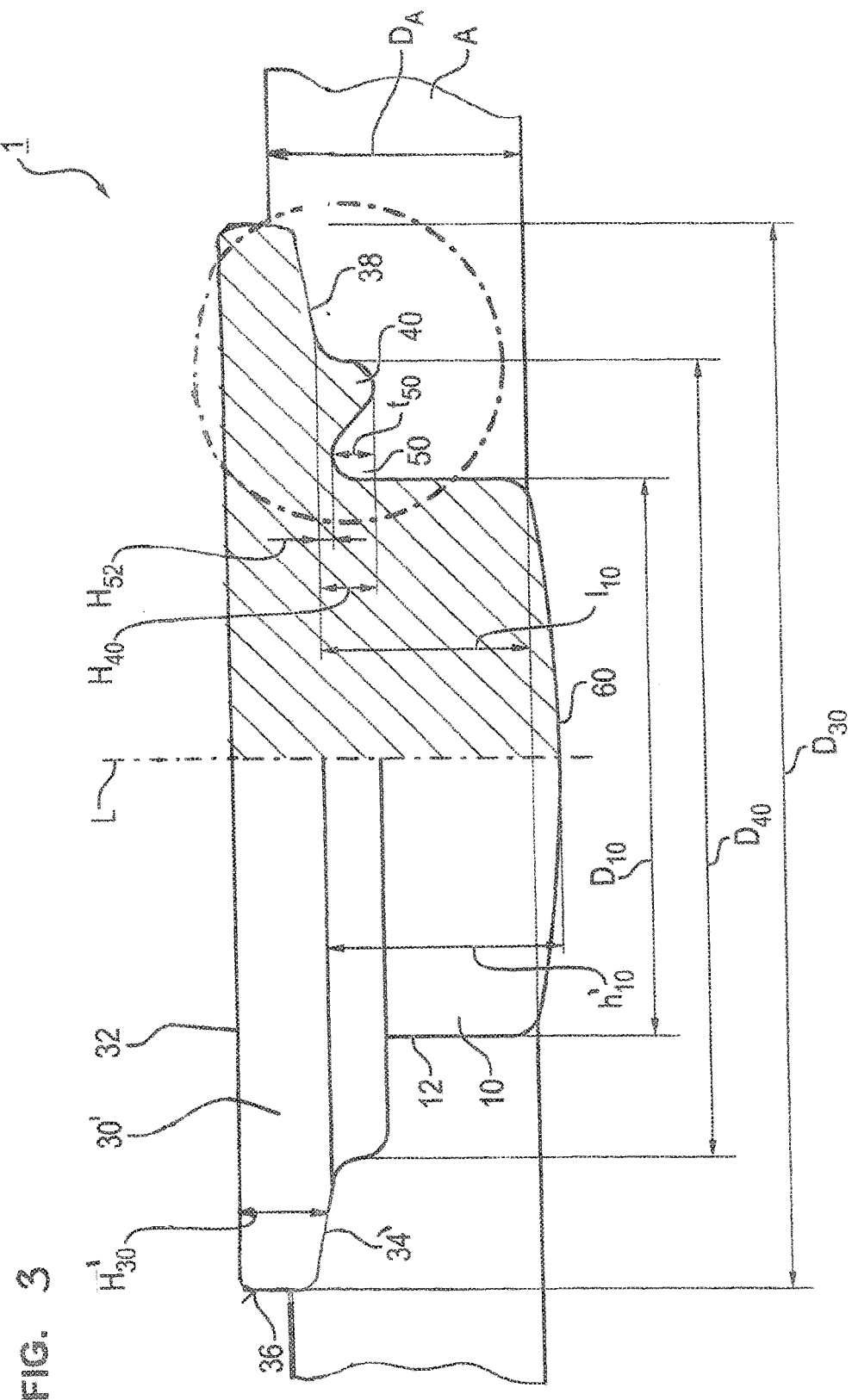
Figure 4:
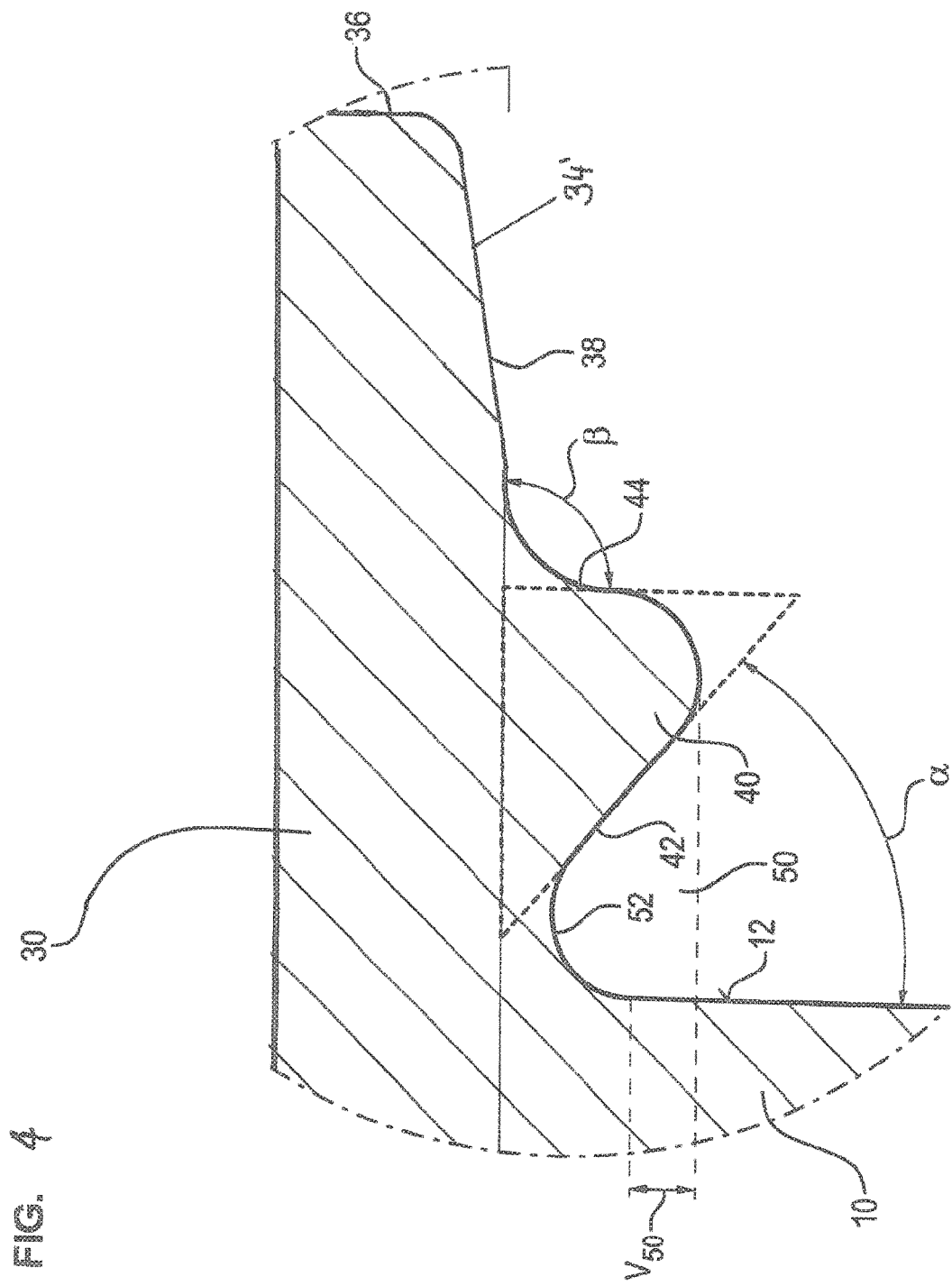
Figure 5:
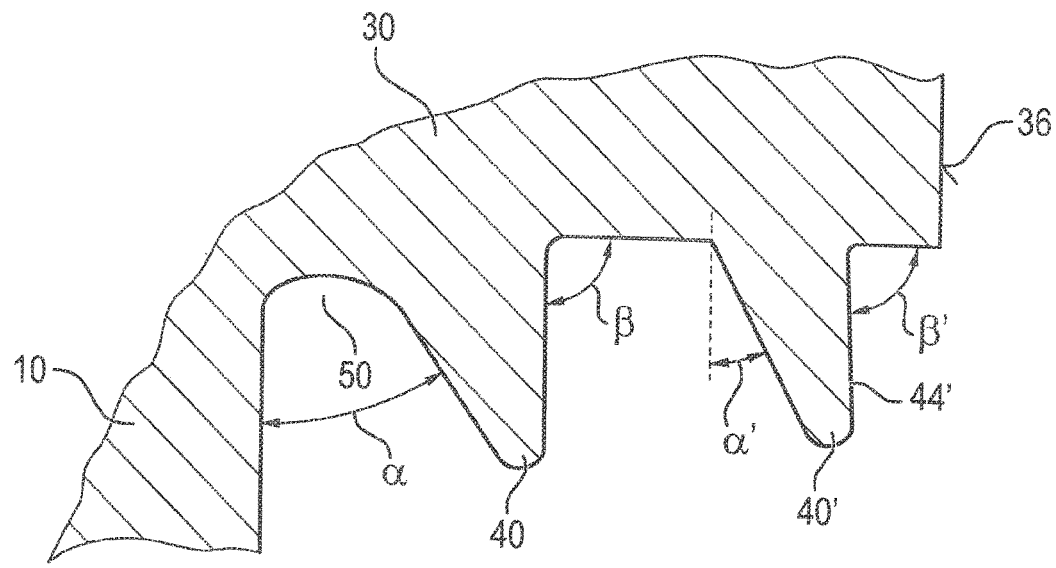
Figure 6:
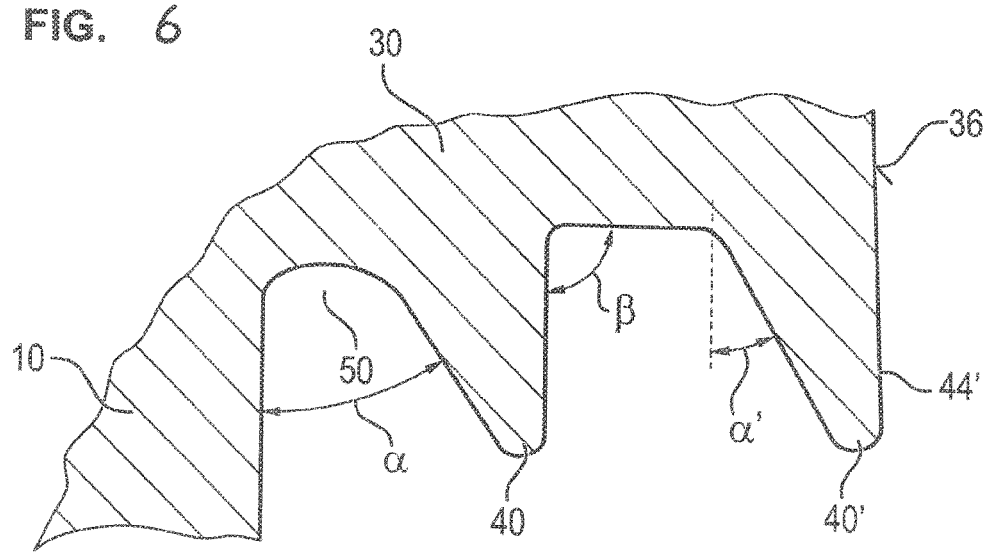
Figure 7:
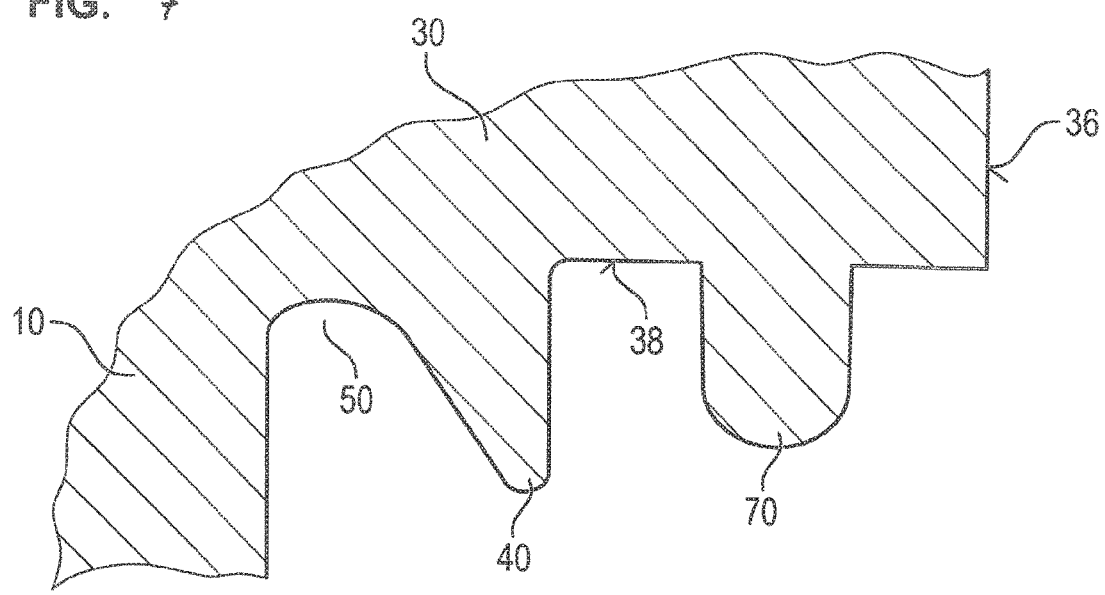
Figure 8:
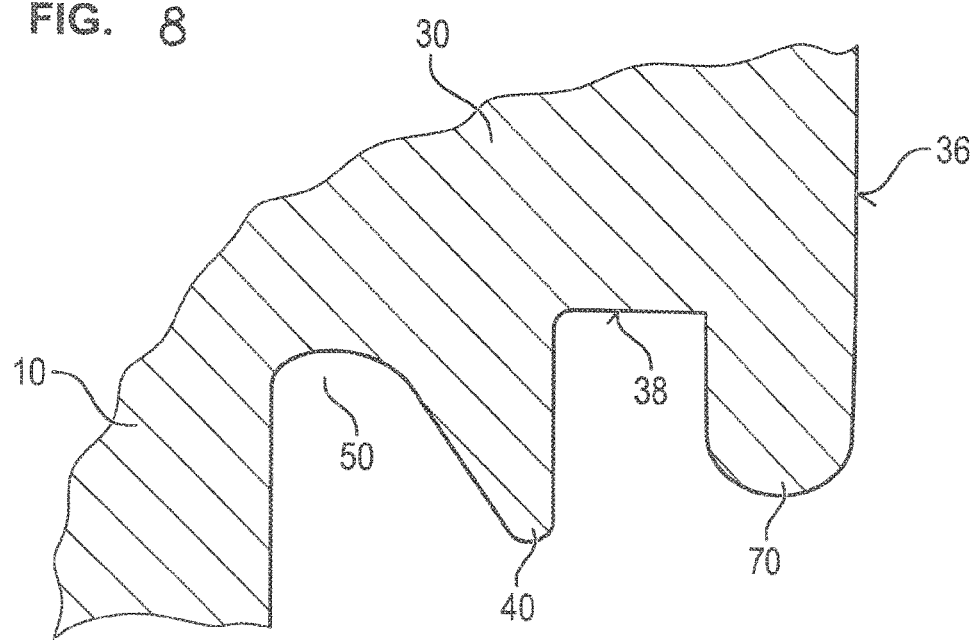
Figure 9:
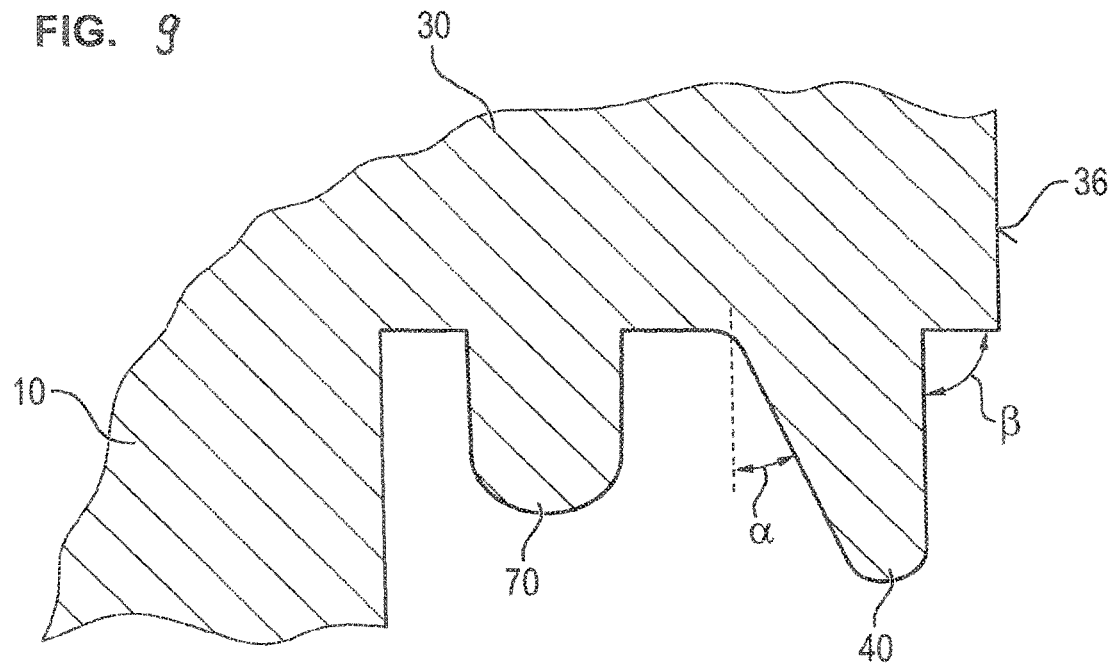
Figure 10:
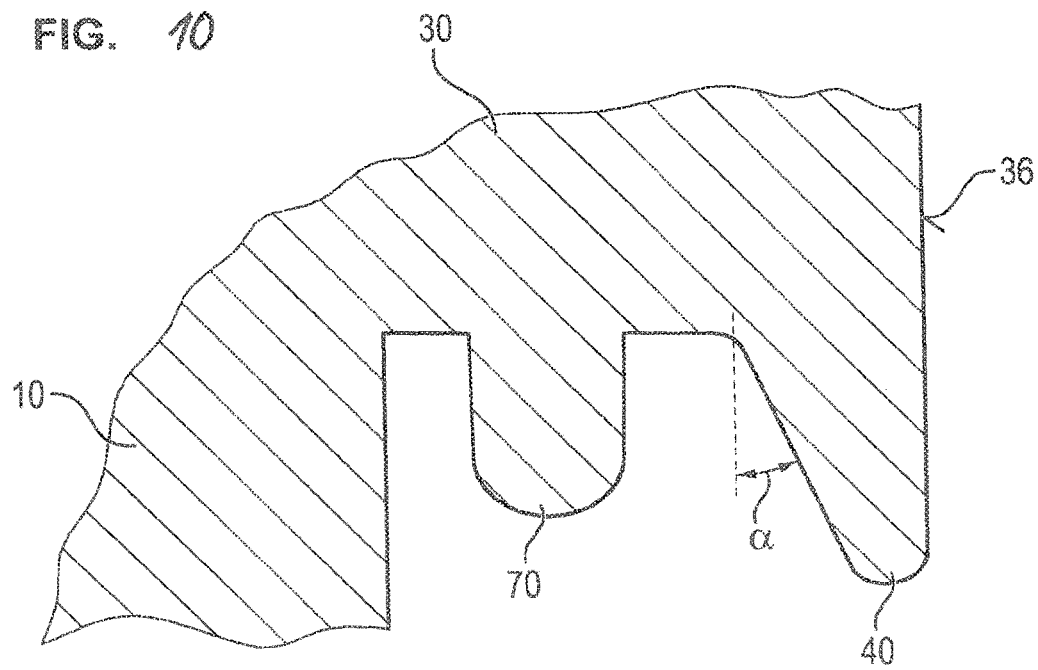
Figure 11:
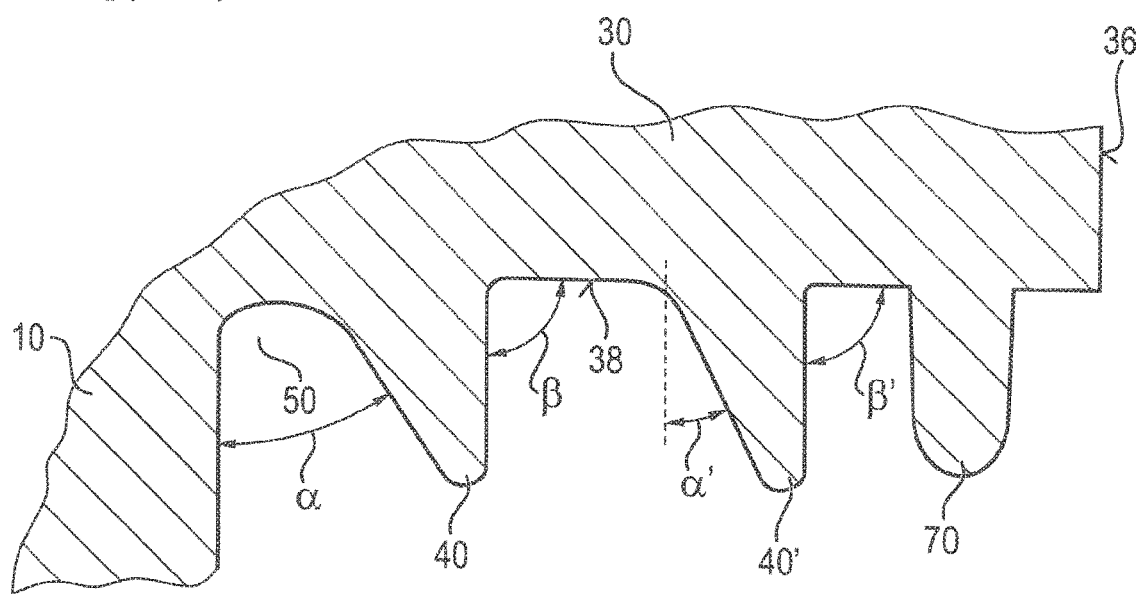
Figure 12:
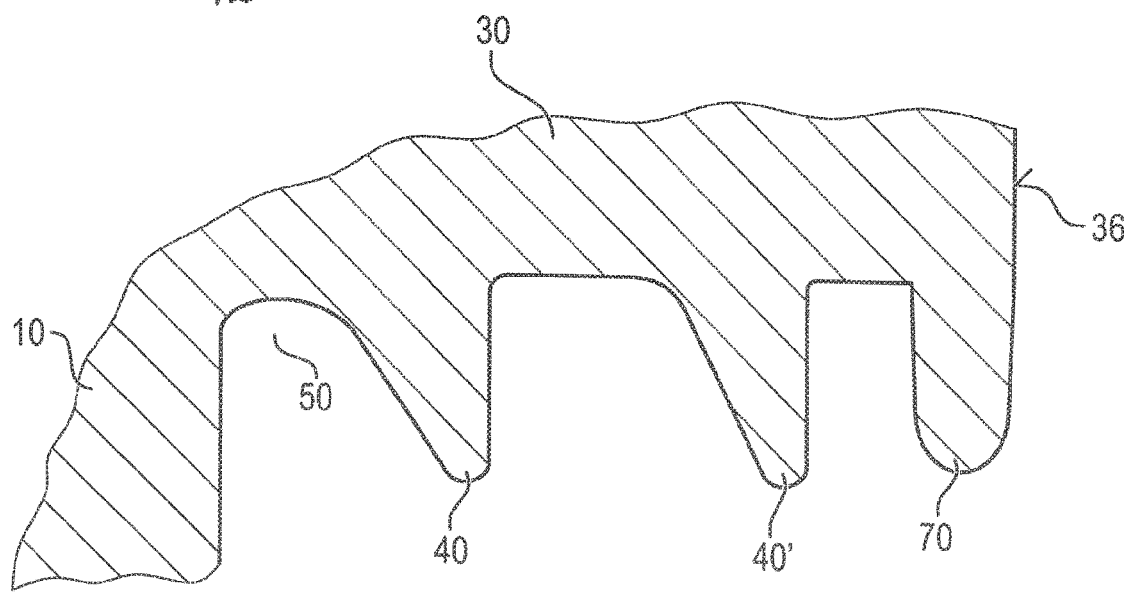
Figure 13:
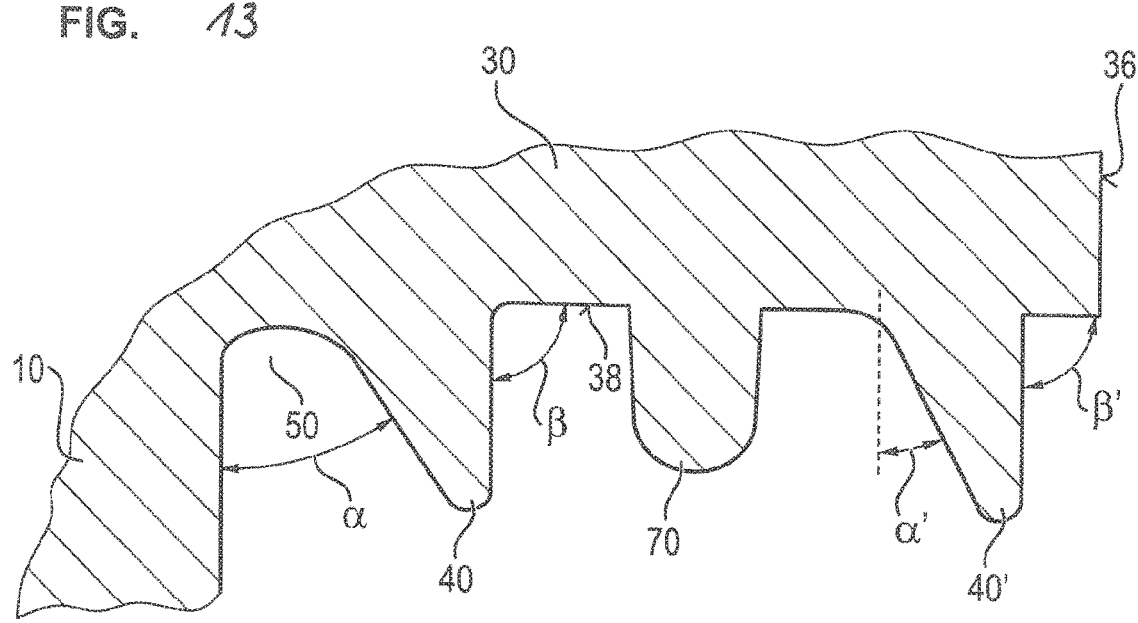
Figure 14:
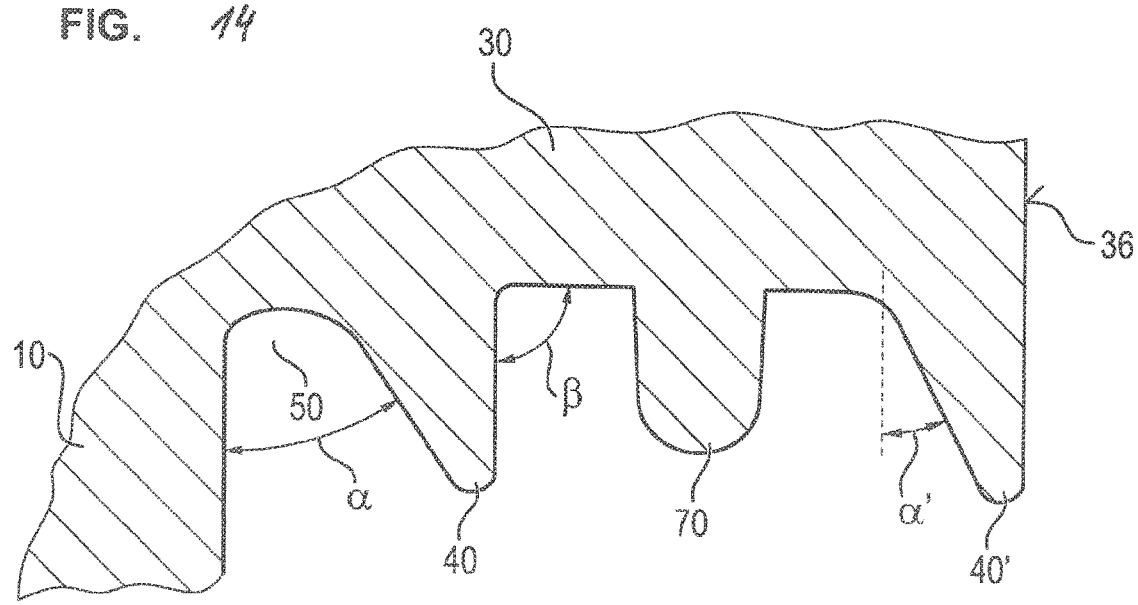
Figure 15:
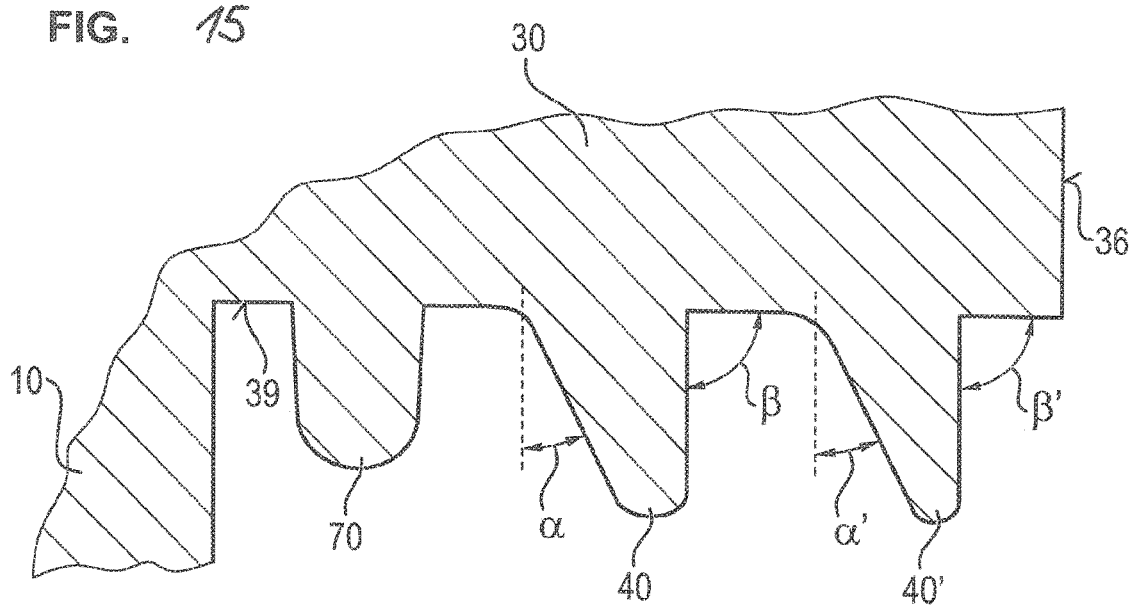
Figure 16:
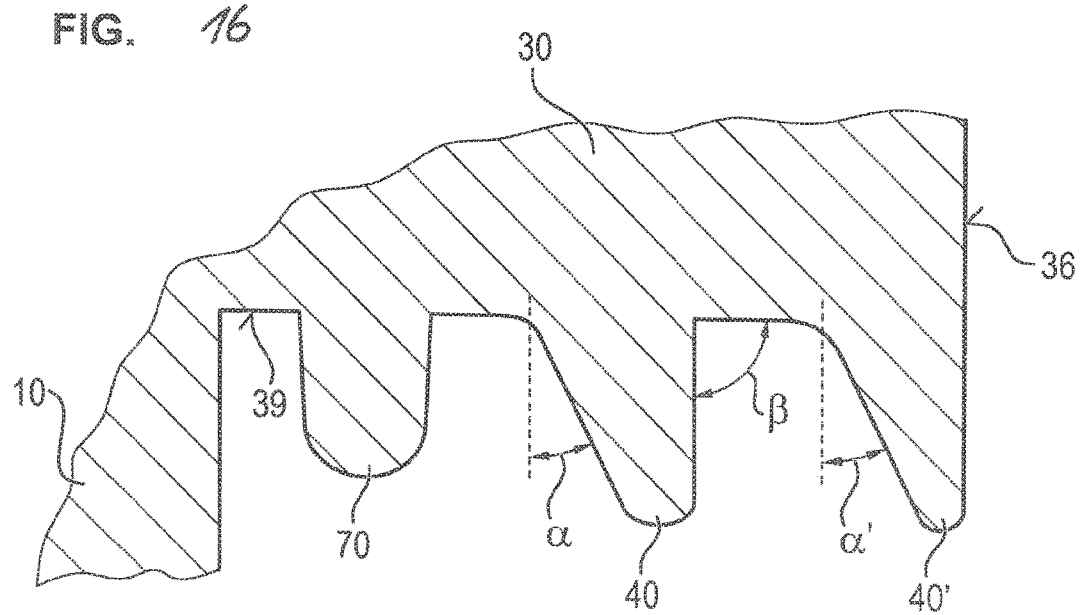
Figure 17:
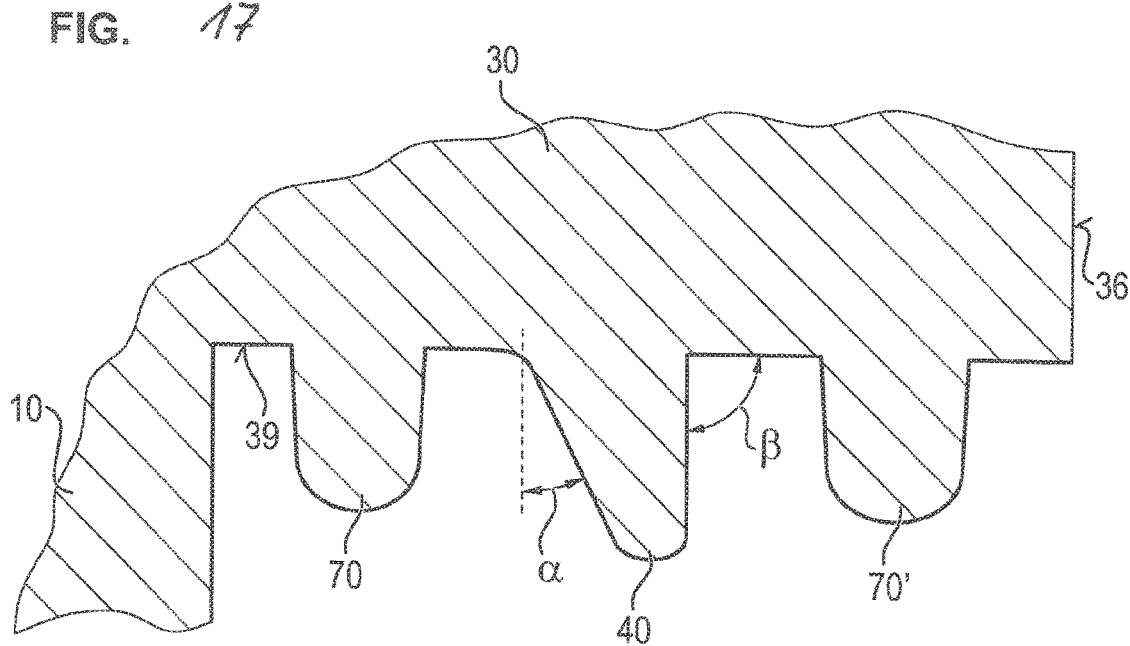
Figure 18:
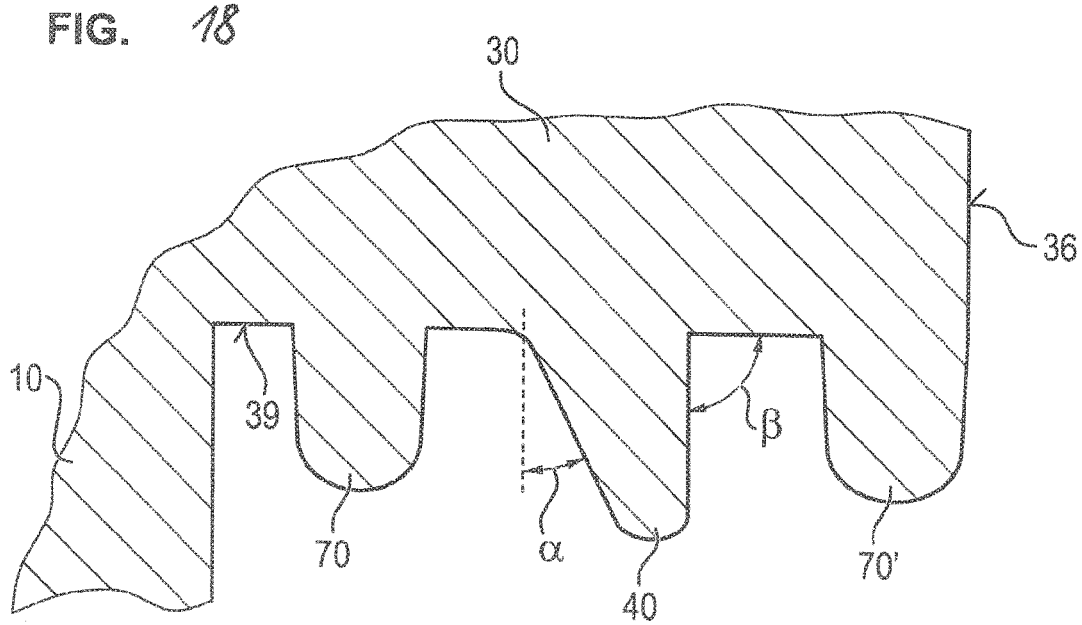

Some embodiments of the present disclosure are described in more detail with reference to the accompanying drawing. Showing in:

FIG. 1 a partial cross-sectional view of an embodiment of the welding auxiliary joining part, FIG. 2 a sectional enlargement of the encircled portion of FIG. 1, FIG. 3 a partial sectional view of a further embodiment of the welding auxiliary joining part with countersunk head, FIG. 4 a sectional enlargement of the encircled portion of FIG. 5, FIG. 5 a sectional enlargement of a further embodiment of the underside of the element head with a first and a second clamping ring, FIG. 6 a sectional enlargement of a further design of an underside of the element head with a first and a second clamping ring, FIG. 7 a sectional enlargement of a further design of the underside of the element head with a clamping ring and a stamping ring arranged radially outwards thereof, FIG. 8 a sectional enlargement of a further design of the underside of the element head with a clamping ring and a stamping ring arranged radially outwards thereto, FIG. 9 a sectional enlargement of a further design of the underside of the element head with a stamping ring and a clamping ring arranged radially outwards thereof, FIG. 10 a sectional enlargement of a further design of the underside of the element head with a stamping ring and a clamping ring arranged radially outwards thereto, FIG. 11 a sectional enlargement of a further design of the underside of the element head with a first and a second clamping ring and a stamping ring arranged radially outwards thereto, FIG. 12 a sectional enlargement of a further design of the underside of the element head with a first and a second clamping ring and a stamping ring arranged radially outwards thereto, FIG. 13 a sectional enlargement of a further design of the underside of the element head with a clamping ring arranged radially inwards, a stamping ring arranged radially outwards thereto and a further clamping ring arranged radially outwards to the stamping ring, FIG. 14 a further embodiment of a design of the underside of the element head with a clamping ring arranged radially inwards, a stamping ring arranged radially outwards thereto and a further clamping ring arranged radially outwards, FIG. 15 a sectional enlargement of a further design of the underside of the element head with a stamping ring arranged radially inside, which is surrounded by two clamping rings arranged radially outside, FIG. 16 a sectional enlargement of a further design of the underside of the element head with a stamping ring arranged radially inside and two clamping rings surrounding it, FIG. 17 a sectional enlargement of a further embodiment of a design of the underside of the element head with a stamping ring arranged radially inside and a further stamping ring arranged radially outside and a clamping ring arranged between the two stamping rings, and FIG. 18 a sectional enlargement of a further design of the underside of the element head with a first stamping ring arranged radially inwards and a second stamping ring arranged radially outwards and a clamping ring arranged between the stamping rings.

5. DETAILED DESCRIPTION

FIG. 1 shows an embodiment of the welding auxiliary joining part 1 in a partial sectional view. The welding auxiliary joining part 1 is made of known weldable materials which are selected according to the welding method used. With regard to the used resistance spot and projection welding, alloy steels may be suitable. However, other materials may also be used here.

The welding auxiliary joining part 1 comprises a punch shaft 10 which extends parallel to a longitudinal axis L of the welding auxiliary joining part 1. The punch shaft 10 is designed to be pressed or punched into a first component A approximately rotation-free. The welding auxiliary joining part 1 is self-punching, so that the welding auxiliary joining part 1 is pressable or punchable into non-pre-punched components as well as into pre-punched components. Accordingly, the welding auxiliary joining part 1 may be configured as a solid punch rivet in order to ensure time-saving and reliable joining into a component A. As solid punch riveting is known in the prior art, the setting tools used for solid punch riveting may also be used for setting the welding auxiliary joining part 1.

As can be seen from the schematic illustration in FIG. 1, the welding auxiliary joining part 1 may be formed rotationally symmetrically about its longitudinal axis L. Here, the punch shaft 10 has a cylindrical shape and may have a diameter $D_{10}$ in the range of 3 mm≤$D_{10}$≤8 mm, or 4 mm≤$D_{10}$≤5 mm and $D_{10}$ may be 4 mm or $D_{10}$ may be 5 mm. The cylindrical shape is distinguished by a smooth lateral face 12. The lateral face 12 may have retaining ribs or retaining rings (not shown) extending transversely to the longitudinal axis L, which support a fastening of the punch shaft 10 in a component opening. As an alternative to the cylindrical shape of the punch shaft 10, the latter has the shape of a truncated cone which expands in the joining direction. It may also be preferred that the punch shaft 10 is not shaped rotationally symmetrically in cross-section. By this, a form-fit against relative rotation between component A and welding auxiliary joining part 1 is realized.

The punch shaft 10 comprises a welding contact zone 60 at its free axial end. The welding contact zone 60 extends beyond a length $L_{10}$ of the punch shaft 10 in order to establish an electrical contact with the second component to be welded during the resistance welding. The design of the welding contact zone 60 is described in more detail below.

An element head 30 is provided at the second axial end of the punch shaft 10, which is integrally formed with the punch shaft 10. The element head 30 comprises a head upper side 32, which may be formed in a flat manner. It also serves as a contact face for a punch (not shown), which presses the welding auxiliary joining part 1 into the component A.

Adjacent to the punch shaft 10, the element head 30 comprises a head underside 34. The head underside 34 is connected to the head upper side 32 via a circumferential face 36. The circumferential face 36 may form a cylindrical lateral face of the element head 30. Accordingly it defines the diameter of the element head 30 and extends along an outline of the element head 30. The element head 30 may have a diameter $D_{30}$ in the range of 7 mm≤$D_{30}$≤12 mm, such as $D_{30}$=10 mm. Furthermore, it may have a height $H_{30}$ in the range of 0.8 mm≤$H_{30}$≤1.8 mm, such as $H_{30}$=1.2 mm. With respect to the punch shaft 10, the element head 30 has a diameter of $D_{30}$≥1.4·$D_{10}$.

If it is advantageous, the circumferential face 36 may also be shaped differently. For example, it may have the shape of a lateral face of a truncated cone if the element head 30 is formed as a countersunk head. It could also be completely omitted if the head upper side 32 forms a round head which transitions directly into the underside 34.

It may also be preferred that the element head 30 has a truncated cone shape, a truncated pyramid shape or a polyhedron shape instead of the cylindrical shape shown in FIG. 1. However, the cylindrical shape is advantageous for a setting process using a joining device, since the cylindrical circumferential face 36 represents a supporting guide face in a joining channel of the joining device.

A clamping ring 40 is arranged at the head underside 34 of the element head 30 concentrically to the longitudinal axis L and to the punch shaft 10. The clamping ring 40 may protrude in the axial direction from the head underside 34. According to an embodiment, only one clamping ring 40 is provided at the otherwise flat head underside 34. This ensures an unhindered radial material flow radially inwards and radially outwards, which is not diverted or blocked by a further clamping ring or stamping ring (see below).

The clamping ring 40 may have a triangular cross-sectional shape, as can be seen from the dashed lines in FIG. 2. FIG. 2 shows a sectional enlargement of the encircled portion of FIG. 1.

The cross-sectional shape of the clamping ring 40 is defined by a radially inner ring side 42 and a radially outer ring side 44. The ring sides 42, 44 in combination with the head underside 34 define a triangular cross-sectional shape of the clamping ring 40. The clamping ring 40 is arranged at a first radial distance from the circumferential face 12 of the punch shaft 10, which is described in more detail below. The clamping ring 40 is surrounded radially outwards by a ring face 38, which forms a part of the head underside 34. The ring face 38 may be formed flat and perpendicular to the longitudinal axis L. In addition, the ring face 38 transitions into the circumferential face 36, whereby the head underside 34 and the head upper side 32 are connected to each other.

In order to be able to weld the first component A made of poorly weldable material, such as plastic or aluminum, to the second component made of weldable material, the welding auxiliary joining part 1 is pressed or punched into the first component A. The component A may have a thickness $D_A$ in the range of 0.8 mm$\leq D_A \leq$3 mm, such as $D_A$=1.5 mm. For this, the first component A supports itself on a die, such as with a central opening (not shown). In order to simplify the setting process as much as possible, the welding auxiliary joining part 1 is pressed into the first component A without rotation. For this, a setting punch applies a joining force to the head upper side 32 and presses the welding auxiliary joining part 1 with the punch shaft 10 first into the component A. Thereby an opening is created in the component A, so that the welding contact zone 60 at the side of the component A facing away from the head protrudes beyond this component side (see FIG. 1). Accordingly, the length $h_{10}$ of the punch shaft 10 is adapted to the thickness $D_A$ of the component A. It may be preferred that the length $h_{10}$ of the punch shaft 10 is 1.1 $D_A \leq h_{10} \leq$2 $D_A$, or 1.4 $D_A \leq h_{10} \leq$1.8 $D_A$. The punch shaft 10 may have a length $h_{10}$ in the range of 1.6 mm$\leq h_{10} \leq$4 mm, in particular $h_{10}$=2 mm. In addition, the element head 30 may have a height $H_{30}$ with respect to the component thickness $D_A$ of 0.5 $D_A \leq H_{30} \leq$2 $D_A$, such as $H_{30}$=$D_A$ applies.

During the setting process, the welding auxiliary joining part 1 is pressed into the component A until at least the head underside 34 with the ring face 38 abuts the component side facing the head. It may also be preferred to press the element head 30 deeper into the component A, so that a part of the element head 30 is received in the component A. During this setting process, the clamping ring 40 is also pressed into the component A.

The radially inner ring side 42 is arranged at an angle α inclined relative to the lateral face 12 or the longitudinal axis L. Since the ring side 42 is arranged at an angle α<90° relative to the circumferential face 12, the ring side 42 displaces material of the component A in the direction of the punch shaft 10 when it is pressed into component A. Especially the radial part of the displaced component material presses against the punch shaft 10 and provides an additional clamping effect and holding force of the punch shaft 10 in the component A due to mechanical radial stresses. The clamping effect increases with increasing radially inwardly directed material displacement. Therefore, the ring side 42 may be arranged in an angle range of 10°$\leq \alpha \leq$70°, such as 40°$\leq \alpha \leq$60°, in particular α=45° or α=50°.

The clamping effect increases with the displaced material volume in the direction of the punch shaft 10. The amount of the material volume is determined by the volume of the clamping ring 40, which protrudes beyond the head underside 34. It may be preferred to vary a height $H_{40}$ of the clamping ring 40 for the purpose of forming the displaced material volume. The height $H_{40}$ of the clamping ring 40 indicates the distance with which the clamping ring 40 protrudes at a maximum beyond the head underside 34 (see FIG. 1). The clamping ring 40 may have a height $H_{40}$ in the range of 0.2 mm$\leq H_{40} \leq$0.6 mm, such as $H_{40}$=0.4 mm.

According to a further embodiment, the clamping ring 40 has a height $H_{40}$ in the range of 0.15 mm$\leq H_{40} \leq$1 mm, such as $H_{40}$=0.5 mm. With this height variation, the clamping ring is flexibly adaptable to both larger and smaller sheet thicknesses in comparison to the previously described embodiment.

Furthermore, the clamping ring 40, which extends concentrically around the punch shaft 10, may have an outer diameter $D_{40}$ in the range of 4 mm$\leq D_{40} \leq$10 mm, such as $D_{40}$=8 mm. With regard to the component A and may be adapted to its dimensions, for the clamping ring 40 the following applies: 0.2·$D_A \leq H_{40} \leq$0.5 $D_A$ and 3·$D_A \leq D_{40} \leq$10·$D_A$. With respect to the punch shaft 10, 0.5·$D_{40} \leq D_{10} \leq$0.8·$D_{40}$ may apply.

The clamping effect is determined by the displaced material of component A pressing radially inwards against the punch shaft 10. For this, the displaced material may be forced into an intermediate space 50 between the lateral face 12 and the inner ring side 42. This intermediate space 50 may also be referred to as a groove, which is arched in the direction of the element head 30.

In order to reduce this intermediate space 50 and thus increase the clamping effect due to displaced material, the intermediate space 50 has a base 52. The base 52 is a face segment which connects the lateral face 12 and the ring side 42 with each other. The base 52 may be arranged axially offset in the direction of the welding contact zone 60. Thus, the base 52 protrudes in the setting direction with respect to the ring face 38 and the head underside 36. In this way, the space for receiving radially inwardly displaced material may be selectively reduced and the clamping effect at the punch shaft 10 is improved. The depth $t_{50}$ of the groove 50 with respect to the highest point of the adjacent clamping ring 40 (see FIG. 1) is in the range of 0.2 mm$\leq t_{50} \leq$0.4 mm, such as $t_{50}$=0.3 mm. It may also be preferred to define the depth $t_{50}$ of the groove 50 with respect to the height $H_{40}$ of the clamping ring 40 with respect to the head underside 34. Therefore, 0.6·$H_{40} \leq t_{50} \leq$1·$H_{40}$ applies.

In order to stabilize the welding auxiliary joining part 1 in the component A, the radially outer ring side 44 is arranged at an angle β in the range of 70°$\leq \beta \leq$110° with respect to the ring face 38. Due to the size of the angle β the ring side 44 extends approximately in the setting direction. In this way, the ring side 44 creates radial stability for the welding auxiliary joining part 1 in the component A.

Referring to the cross-sectional shape of the clamping ring 40 and the size of the angles α and β, it may be preferred that the cross-sectional shape approximately comprises a right-angled triangle. Therefore the angle β may be equal to 90°. The hypotenuse of this triangular form faces the punch shaft 10 in order to cause an advantageous material flow radially inwards.

In addition, the fastening of the welding auxiliary joining part 1 in the component A may be influenced by the shape of the groove 50. It has been proven to be advantageous and therefore may be preferred if the outwardly delimiting wall of the groove 50 is formed on the one hand by the obliquely inclined side 42 of the clamping ring 40 and on the other hand by a vertical section $v_{50}$ of the punch shaft 10. The vertical section $v_{50}$ is a section of the lateral face of the punch shaft 10 which extends perpendicularly to the element head 30 or parallel to the longitudinal axis L of the welding auxiliary joining part 1. This section begins at the level of the clamping ring 40 and extends in the direction of the element head 30 until a connecting curvilinear connecting portion or area, such as a circular arc, begins between the vertical section $v_{50}$ and the hypotenuse 42 of the clamping ring 40 (see FIG. 2). The support of the welding auxiliary joining part 1 in the component A may be supported with an increasing size of the vertical portion $v_{50}$. Accordingly, the vertical portion $v_{50}$ has a size of $0 \leq v_{50} \leq 0.3\, t_{50}$, or $v_{50} = 0.1\, t_{50}$ or $v_{50} \geq 0.2\, t50$.

If it is sufficient for holding the welding auxiliary joining part 1, the groove 52 is formed solely by the curvilinearly extending portion at the rivet base 52. In this case, the curvilinear portion ends at the level or height of the clamping ring 40, so that no vertical portion $v_{50}$ is used in this embodiment.

Furthermore, the above-mentioned vertical section $v_{50}$ may transition into the curvilinear rivet base 52 at an angle $\gamma$ from the range of $40° \leq \gamma \leq 60°$, such as $\gamma = 50°$.

Opposite to the element head 30, the welding contact zone 60 is arranged at the punch shaft 10. According to a further embodiment, the welding contact zone 60 has the shape of a welding stud projecting axially from the punch shaft 10 or of a welding projection. These have a smaller diameter than the punch shaft 10. In addition, they have an arched, mostly rounded shape in order to establish a punctiform contact with the second component.

According to a further embodiment, the welding contact zone 60 is formed as a convex axial end of the punch shaft 10. This convex end arches in a circular arc at the end of the punch shaft 10 in the joining direction. This shaping also provides a sufficient, punctiform contact face with the second component for the resistance welding. Of course, a formed tip can also be used at this position.

A further embodiment of the welding auxiliary joining part 1' is shown in FIGS. 3 and 4. In this embodiment, the same reference signs for the element geometry described above also indicate the same features. These geometric features described above may therefore be transferred to the element geometry described here.

The welding auxiliary joining part 1' comprises a countersunk head as element head 30'. The head underside 34' of the element head 30' may be arranged in its course radially outwardly inclined starting at the clamping ring 40. The inclination is present in the direction facing away from the shaft. Accordingly, the height $H_{30'}$ of the element head 30' is reduced radially outwards up to the circumferential face 36.

The countersunk head geometry makes it possible to lower the element head 30' into the component during the setting process. In this way, the interference contour of the element head 30' is reduced after the joining process. The element head 30' protrudes less than 0.4 mm from the component surface after setting in the component. Furthermore, the size of the contact face between the component and the underside 34' of the element head 30' may be increased. This allows the possibility to transfer heat via a larger interface between element and component during a later welding process. This can support a selective component heating or reduce a component damage of a smaller contact portion or area between element and component due to heat.

Due to the countersunk head geometry, the element head 30' may have a radially outward decreasing axial thickness $H_{30'}$ between the head upper side 32 and the head underside 34'. Outside of the groove 50 or the clamping ring 40, the axial thickness $H_{30'}$ of the element head 30' may be in the range of $0.3\, \text{mm} \leq H_{30'} \leq 0.8\, \text{mm}$, or $0.4\, \text{mm} \leq H_{30'} \leq 0.5\, \text{mm}$.

Furthermore, the punch shaft 10 measured between the free shaft end and the radially outermost head underside 34' may have a length $h_{10'}$ in the range of $1.4\, \text{mm} \leq h_{10'} \leq 3\, \text{mm}$, or $1.4\, \text{mm} \leq h_{10'} \leq 2.2\, \text{mm}$ or $1.4\, \text{mm} \leq h_{10'} \leq 1.6\, \text{mm}$. This geometry design in combination with the countersunk head 30' supports a reduced interference contour of the set welding auxiliary joining part 1' and/or a variable applicability in thin components.

The clamping ring 40 has a height $H_{40}$ with respect to the head underside 34' directly adjoining the clamping ring 40 radially outwards in the range of $0.2\, \text{mm} \leq H_{40} \leq 1\, \text{mm}$, such as 0.6 mm and in particular 0.4 mm.

In FIGS. 5 and 6 further designs of the underside 34 of the element head 30 are shown. In particular, FIGS. 5 and 6 show a sectional enlargement of a part of the element head 30. According to the embodiments of the welding auxiliary joining part 1 described above, the use of only one clamping ring 40 is advantageous. In order to increase the clamping effect of radially inwardly directed material stresses, an outer ring may be arranged at the head underside 34, which surrounds the inner clamping ring 40. In the embodiments of FIGS. 5 and 6, this outer ring also has the configuration of a clamping ring 40'. It may also be preferred to design this outer ring as a stamping ring 70, as shown as an example in the embodiments of FIGS. 7 and 8.

If the outer ring has the configuration of a clamping ring 40', the same geometrical features, functional properties and design principles apply as described above for the clamping ring 40. The clamping ring 40' may be arranged concentrically around the clamping ring 40. In addition, the clamping ring 40' extends continuously around the punch shaft 10 or it is interrupted at regular intervals. According to the embodiment in FIG. 5, the clamping ring 40' arranged radially at the outer side is radially inwardly spaced from the circumferential face 36. As a result, the material displaced by the clamping ring 40' cannot flow off unhindered against the joining direction. Instead, it is blocked by the underside 34 of the element head 30, which causes a further clamping effect and thus fixation of the welding auxiliary joining part in the material of the component A.

It may also be preferred to arrange the further clamping ring 40' at the radial outer side of the element head 30 as a last point. Accordingly, the radially outer ring side 44 then transitions into the circumferential face 36. This configuration allows an unhindered material displacement radially outwards into the material of the component A surrounding the welding auxiliary joining part 1.

As can be seen from the embodiments of FIGS. 7 and 8, the outer ring provided in addition to the clamping ring 40 alternatively has the configuration of a stamping ring 70. A stamping ring 70 may be uniformly or axially symmetrically shaped with respect to its cross-section. It follows from this that a material displacement may occur to the same extent radially inwards as radially outwards. During the joining process, the stamping ring 70 is pressed into the component A. The pressed-in stamping ring acts as a seal of the joining position against material or dirt penetrating from the outside, but also against gases occurring, for example, during joining from the inside to the outside. In addition, the adjacent arrangement of the stamping ring 70 and the clamping ring 40 has the advantage that material is compressed between the radially outer ring side 44 and the stamping ring 70. This supports the hold of the welding auxiliary joining part in the component A and the sealing by the stamping ring 70.

To enhance the effect of the stamping ring 70, it may be arranged radially inwards with respect to the circumferential face 36 at the underside 34 of the element head 30. If unhindered material displacement can be tolerated radially outwards and against the joining direction, it may also be preferred to arrange the stamping ring 70 directly adjacent to the circumferential face 36 (see FIG. 6).

If it should be necessary to particularly protect the joining position or location against the escape of e.g. gases or against the penetration of contaminants, a stamping ring 70 may be arranged in direct proximity of the punch shaft 10. In this regard, further designs of the welding auxiliary joining part 1 are shown in FIGS. 9 and 10. The stamping ring 70 is positioned within a surrounding clamping ring 40, respectively. For further use of the effect of the clamping ring 40, the clamping ring 40 is configured in such a manner that the material displacement takes place radially inwards against the stamping ring 70. The lateral face of the stamping ring 70, in particular the radially outer lateral face of the stamping ring 70, may take over the function of the lateral face of the stamping shaft 10. Accordingly, the welding auxiliary joining part 1 is then held against the stamping ring 70 by radially inwardly acting mechanical stresses or tensions.

FIGS. 11 and 12 show further embodiments of the design of the underside 34 of the element head 30. In particular, here, the embodiment of FIG. 5 was combined with the two clamping rings 40, 40' with an additional radially outwardly arranged stamping ring 70. This radially outwardly arranged stamping ring 70 is arranged in the same manner as in the embodiments of FIGS. 7 and 8 radially inwards at a distance from the circumferential face 36 or directly adjacent to the circumferential face 36. The stamping ring 70, which is formed continuously or is regularly interrupted, may ensure a sealing of the joining position to the outside.

The embodiments of FIGS. 13 and 14 are based on the embodiment of FIG. 7. Here, in order to achieve an additional clamping effect at the stamping ring 70, an additional outer ring was arranged with respect to the existing clamping ring 40 and the stamping ring 70. This outer ring has the shape and configuration of an additional clamping ring 40'. Correspondingly, this clamping ring 40' generates a radially inwardly directed additional material flow. This causes additional radial stresses which act against the radial outer side of the stamping ring 70. As in the designs of FIGS. 5 and 6, the radially outer clamping ring 40' is arranged radially inwards at a distance from the circumferential face 36 (see FIG. 13). It may also be preferred that the clamping ring 40' arranged radially at the outer side transitions directly into the circumferential face 36, as can be seen in FIG. 12.

The embodiments of the underside 32 of the element head 30 shown in FIGS. 16 and 17 show the combination of the embodiment of FIG. 9 with another clamping ring 40' arranged radially at the outer side. This clamping ring 40' arranged radially at the outer side increases the clamping effect which is already achieved by the material displacement due to the clamping ring 40. Thereby the additional clamping ring 40' displaces material radially inwards against the radially outer ring side 44 of the clamping ring 40. The radially outer clamping ring 40' may be arranged radially inwards at a distance from the circumferential face 36, as shown in FIG. 16. It may also be preferred that the clamping ring 40' arranged radially at the outer side is arranged directly adjacent to the circumferential face 36, as can be seen in FIG. 17.

In the same way as it has been emphasized with regard to the above-described embodiments, the additional clamping ring 40' arranged radially at the outer side has a continuously circumferential shape or it is provided to be interrupted at regular intervals.

FIGS. 18 and 19 show a combination of the embodiment of FIG. 9 with another stamping ring 70' arranged radially at the outer side. This additional stamping ring 70' arranged radially at the outer side provides an additional and complementary sealing effect to the stamping ring 70' arranged radially at the inner side. In addition, the stamping ring 70' arranged radially at the outer side may be provided to be continuously or to be regularly interrupted. Furthermore, the stamping ring 70' may be arranged radially inwards at a distance from the circumferential face 36, as shown in FIG. 18. According to a further embodiment, which is shown in FIG. 19, the stamping ring 70' arranged radially at the outer side is arranged directly adjacent to the circumferential face 36.

The invention claimed is:

1. A welding auxiliary joining part with which a welding connection is establishable between a first component of poorly weldable material and a second component of weldable material, which comprises the following features:
   a. a punch shaft which is punchingly pressable into the first component without rotation, which extends along a longitudinal axis of the welding auxiliary joining part and which has an element head at a first axial end and a welding contact zone projecting in the axial direction from the punch shaft at a second axial end,
   b. the element head extends radially beyond the punch shaft and comprises a head upper side facing away from the shaft and a head underside facing towards the shaft, which are connected to one another by means of a circumferential face which radially delimits the element head, and in which
   c. the head underside comprises one or more rings protruding from the head underside axially in the direction of the punch shaft, wherein the one or more rings include only:
      c1. one clamping ring,
      c2. one clamping ring and one stamping ring,
      c3. two clamping rings, or
      c4. two clamping rings and one stamping ring, wherein
   d. in each case the radially outermost ring is surrounded at the side facing away from the punch shaft by a radially extending outer ring face at the head underside, and
   e. the clamping ring extends around the punch shaft in a closed manner and projects axially in the direction of the punch shaft, wherein the axial cross-sectional shape of the clamping ring is formed by a radially inner ring side and a radially outer ring side and
      e1. the radially inner ring side of which is arranged at a first radial distance from the punch shaft,
      e2. the radially outer ring side of which is arranged at a side facing away from the punch shaft radially spaced from the circumferential face of the element head, and
      e3. the inner ring side encloses with the punch shaft an inclination angle $\alpha$ in the range of $10°<\alpha<70°$, and
      e4. the at least one first clamping ring has a triangular cross-sectional shape which tapers in the axial direction of the punch shaft and has a rounded axial end so that the at least one first clamping ring clamps the punch shaft by a correspondingly diverted material flow and does not hinder the penetration of the welding auxiliary joining part into the first component at the same time, and
   g. the welding contact zone at the second axial end is adapted to project beyond a side of the first component facing away from the element head, and the head underside is adapted to abut at a side of the first component facing the element head so that the head underside comprising the one or more rings is axially spaced from the second axial end.

2. The welding auxiliary joining part according to claim 1, in which the outer ring side of the clamping ring encloses with the head underside an angle β in the range of 70°≤β≤110°.

3. Welding auxiliary joining part according to claim 1, wherein the head underside solely comprises one clamping ring and the clamping ring tapers in the axial direction of the punch shaft.

4. Welding auxiliary joining part according to claim 1, which comprises a groove at the head underside between the punch shaft and the adjacent clamping ring or the adjacent stamping ring, which groove is recessed in the direction of the element head.

5. Welding auxiliary joining part according to claim 4, in which the element head has a greater thickness in the longitudinal direction of the punch shaft in the portion of the groove than outside of the groove and the clamping ring and/or the stamping ring.

6. The welding auxiliary joining part according to claim 1, in which a ratio of a head diameter of the element head to a shaft diameter of the cylindrical punch shaft is greater than or equal to two.

7. The welding auxiliary joining part according to claim 1, in which a shaft diameter $D_{10}$ of the punch shaft compared to an outer diameter $D_{40}$ of the clamping ring is approximately $0.5\ D_{40} \leq D_{10} \leq 0.8\ D_{40}$.

8. Welding auxiliary joining part according to claim 1, in which the punch shaft has a shaft diameter $D_{10}$ in the range of 3 mm≤$D_{10}$≤8 mm, the element head has a head diameter $D_{30}$ in the range of 7 mm≤$D_{30}$≤12 mm, and the clamping ring has a ring diameter $D_{40}$ in the range of 4 mm≤$D_{40}$≤10 mm.

9. Welding auxiliary joining part according to claim 1, in which the element head has an axial thickness $H_{30}$ between the head upper side and the head underside outside of a groove or ring in the range of 0.8 mm≤$H_{30}$≤1.8 mm, and the punch shaft has a length $h_{10}$ in the range of 1.6 mm≤$h_{10}$≤4 mm.

10. Welding auxiliary joining part according to claim 1, in which the clamping ring has a height $H_{40}$ with respect to the head underside in the range of 0.2 mm≤$H_{40}$≤0.6 mm.

11. Welding auxiliary joining part according to claim 1, in which the clamping ring has a height $H_{40}$ with respect to the head underside in the range of 0.15 mm≤$H_{40}$≤1 mm.

12. Welding auxiliary joining part according to claim 1, in which the element head is formed as a countersunk head at least radially outwardly from the clamping ring, has a radially outwardly decreasing axial thickness $H_{30}'$ between the head upper side and the head underside outside of a groove or ring in the range of 0.3 mm≤$H_{30}'$≤0.8 mm, and the punch shaft measured between the free shaft end and the radially outermost head underside has a length $h_{10}'$ in the range of 1.4 mm≤$h_{10}'$≤3 mm.

13. Welding auxiliary joining part according to claim 1, in which the clamping ring has a height $H_{40}$ with respect to the head underside adjacent to the clamping ring in the range of 0.2 mm≤$H_{40}$≤1 mm.

14. Welding auxiliary joining part according to claim 4, in which the groove has a depth $t_{50}$ in comparison with a height of an immediately adjacent clamping ring or stamping ring in the range of 0.2 mm≤$t_{50}$≤0.6 mm.

15. Welding auxiliary joining part according to claim 1, in which the welding contact zone is formed by a welding stud having a smaller radial extent than the punch shaft or by a convex welding projection having the same radial extent as the punch shaft.

16. Component composite comprising at least a first component and a welding auxiliary joining part according to claim 1, which is fastened in the first component in a loss-proof manner.

17. Component composite according to claim 16, in which the first component has a thickness DA in the range of 0.8 mm≤$D_A$≤3 mm.

18. Component composite according to claim 17, in which the element head has a thickness $H_{30}$ in the range 0.5 $D_A$≤$H_{30}$≤2 $D_A$ and the clamping ring has a height $H_{40}$ and a diameter $D_{40}$ in the ranges 0.2 $D_A$≤$H_{40}$≤0.5 $D_A$ and 3 $D_A$≤$D_{40}$≤10 $D_A$ and the punch shaft has a length h10 in the range 1.1 $D_A$≤$h_{10}$≤2 $D_A$.

19. Component composite according to claim 16, in which the first component is welded to a second component by means of the welding auxiliary joining part.

20. Manufacturing method of a component composite of at least a first component and the welding auxiliary joining part according to claim 1, which comprises the following steps:
 a. providing the first component,
 b. pressing the welding auxiliary joining part into the first component approximately rotation-free, so that
  the punch shaft completely penetrates the component,
  the welding contact zone projects beyond a component side facing away from the element head, and
  the element head abuts against a component side facing the element head and the clamping ring is thereby stamped into the component side facing the element head.

21. Manufacturing method according to claim 20, with the further step:
 c. arranging the first component with the welding auxiliary joining part above a second component in such a manner that an electrical contact is establishable between the welding contact zone of the punch shaft and the second component, and
 d. resistance welding the welding auxiliary joining part and the second component.

22. Manufacturing method according to claim 20, in which the welding auxiliary joining part is fastened in a loss-proof manner in the first component after pressing-in, and the first component is present as a semi-finished product, and resistance welding of the semi-finished product with the second component at the place of manufacture of the pressing-in and/or after intermediate storage of the semi-finished product after pressing-in or after transport from the place of manufacture of the pressing-in to a processing place for resistance welding.

23. Manufacturing method according to claim 20, wherein pressing the clamping ring into the first component displaces a material portion of the first component radially inwards so that the punch shaft is clamped by the displaced material.

\* \* \* \* \*